(12) United States Patent
Peters

(10) Patent No.: US 9,422,394 B2
(45) Date of Patent: Aug. 23, 2016

(54) THERMOPLASTIC POLYURETHANE AND ASSOCIATED METHOD AND ARTICLE

(71) Applicant: SABIC Global Technologies B.V., Bergen op Zoom (NL)

(72) Inventor: Edward Norman Peters, Lenox, MA (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 387 days.

(21) Appl. No.: 13/929,961

(22) Filed: Jun. 28, 2013

(65) Prior Publication Data

US 2015/0004341 A1    Jan. 1, 2015

(51) Int. Cl.

| | |
|---|---|
| *C08G 18/48* | (2006.01) |
| *C08G 18/08* | (2006.01) |
| *C08G 18/66* | (2006.01) |
| *C08G 18/76* | (2006.01) |
| *C08G 18/10* | (2006.01) |
| *C08G 18/32* | (2006.01) |
| *C08G 18/40* | (2006.01) |
| *C08G 18/42* | (2006.01) |

(52) U.S. Cl.
CPC ............ *C08G 18/4879* (2013.01); *C08G 18/10* (2013.01); *C08G 18/3206* (2013.01); *C08G 18/4018* (2013.01); *C08G 18/4238* (2013.01); *C08G 18/4808* (2013.01); *C08G 18/4854* (2013.01); *C08G 18/6674* (2013.01); *C08G 18/7671* (2013.01); *Y10T 428/139* (2015.01)

(58) Field of Classification Search
CPC .. C08G 18/10; C08G 18/324; C08G 18/4879; C08G 18/3206; C08G 18/4018; C08G 18/4238; C08G 18/4808; C08G 18/4854; C08G 18/6674; C08G 18/7671; Y10T 428/139
USPC ....................... 428/36.9, 36.91, 35.7; 525/534
See application file for complete search history.

(56) References Cited

U.S. PATENT DOCUMENTS

| | | | |
|---|---|---|---|
| 3,256,215 | A | 6/1966 | Doedens et al. |
| 3,383,340 | A | 5/1968 | MacCallum et al. |
| 3,575,896 | A | 4/1971 | Khan |
| 3,770,850 | A | 11/1973 | White |

(Continued)

FOREIGN PATENT DOCUMENTS

| | | |
|---|---|---|
| CN | 102382382 A | 3/2012 |
| GB | 1005043 | 9/1965 |

(Continued)

OTHER PUBLICATIONS

U.S. Appl. No. 13/538,295, filed Jun. 29, 2013.

(Continued)

*Primary Examiner* — Yan Lan
(74) *Attorney, Agent, or Firm* — Cantor Colburn LLP

(57) ABSTRACT

A thermoplastic polyurethane is formed by the reaction of a specific hydroxy-diterminated poly(phenylene ether) and an organic diisocyanate. The polyurethane-forming reaction optionally employs diols other than the hydroxy-diterminated poly(phenylene ether). Compared to thermoplastic polyurethanes lacking the residue of the hydroxy-diterminated poly(phenylene ether), the thermoplastic polyurethanes described herein exhibit properties including one or more of improved heat and oxidation resistance, improved resistance to acids, bases, and solvent, and reduced water absorption.

16 Claims, 3 Drawing Sheets

(56) References Cited

U.S. PATENT DOCUMENTS

| | | | |
|---|---|---|---|
| 4,238,580 | A | 12/1980 | Loucks et al. |
| 4,289,682 | A | 9/1981 | Peters |
| 4,487,918 | A | 12/1984 | Heitz et al. |
| 4,521,584 | A | 6/1985 | Heitz et al. |
| 4,677,185 | A | 6/1987 | Heitz et al. |
| 5,064,869 | A | 11/1991 | Bopp et al. |
| 5,164,421 | A | 11/1992 | Kiamil et al. |
| 5,648,019 | A | 7/1997 | White, III et al. |
| 5,880,221 | A | 3/1999 | Liska et al. |
| 6,051,662 | A | 4/2000 | Tracy et al. |
| 6,307,010 | B1 | 10/2001 | Braat et al. |
| 6,962,965 | B2 | 11/2005 | Yeager |
| 7,541,421 | B2 | 6/2009 | Carrillo et al. |
| 7,615,604 | B2 | 11/2009 | Verborgt et al. |
| 7,671,167 | B2 | 3/2010 | Carrillo et al. |
| 2005/0187373 | A1 | 8/2005 | Yeager |
| 2008/0076843 | A1 | 3/2008 | Clark |
| 2011/0124760 | A1 | 5/2011 | Chen et al. |
| 2011/0130476 | A1 | 6/2011 | Chew et al. |
| 2011/0152471 | A1 | 6/2011 | Kamalakaran et al. |
| 2012/0009414 | A1 | 1/2012 | Golini |
| 2012/0037410 | A1 | 2/2012 | Amou et al. |
| 2012/0259086 | A1 | 10/2012 | Yamashita et al. |

FOREIGN PATENT DOCUMENTS

| | | |
|---|---|---|
| GB | 1330947 | 9/1973 |
| WO | 9304101 A1 | 3/1993 |
| WO | 2012177361 A1 | 12/2012 |

OTHER PUBLICATIONS

U.S. Appl. No. 13/647,829, filed Oct. 9, 2012.
U.S. Appl. No. 13/953,858, filed Jul. 30, 2013.
Chan et al., "Facile Quantitative Analysis of Hydroxyl End Groups of Poly(2,6-dimethyl-1,4-phenylene oxide)s by 31P NMR Spectroscopy", Macromolecules, 1994, vol. 27, pp. 6371-6375.
"DABCO 33-LV: Polyurethane Additives Product Bulletin", Air Products and Chemicals, Inc., 2012, Pub. No. 140-11-049-GLB, 2 pages.
Niax Catalyst A-1, Technical Data Sheet, Momentive, HCD-14618, Jul. 18, 2013, 3 pages.
Polycat 8 Catalyst, Air Products and Chemical, Inc., 2013, 2 pages.
U.S. Appl. No. 14/032,254, filed Sep. 30, 2013.
International Search Report dated Oct. 28, 2014; International Application No. PCT/US2014/043763; International Filing Date Jun. 24, 2014; 5 pages.
Written Opinion dated Oct. 28, 2014; International Application No. PCT/US2014/043763; International Filing Date Jun. 24, 2014; 6 pages.
International Search Report dated Nov. 20, 2014; International Application No. PCT/US2014/048539; International Filing Date Jul. 29, 2014; (6 pages).
Written Opinion dated Nov. 20, 2014; International Application No. PCT/US2014/048539; International Filing Date Jul. 29, 2014 (5 pages).
International Search Report dated Dec. 18, 2014; International Application No. PCT/US2014/054895; International Filing Date Sep. 10, 2014 (5 pages).
Written Opinion dated Dec. 18, 2014; International Application No. PCT/US2014/054895; International Filing Date Sep. 10, 2014 (4 pages).
Notice of Allowance dated Jun. 25, 2015; U.S. Appl. No. 13/953,858, filed Jul. 30, 2013 (20 pages).
International Preliminary Report on Patentability dated Oct. 15, 2015, International Application No. PCT/US2014/043763, International Filing Date Jun. 24, 2014 (7 pages).
Final Office Action dated Oct. 15, 2015; U.S. Appl. No. 14/032,254, filed Sep. 20, 2013 (9 pages).
ETHACURE 100 Curative, Product Data Sheet, Jul. 2011, 2 pages.
Levchick et al., "Thermal decomposition, combustion and fire-retardancy of polyurethanes • a review of the recent literature", Polym. Int., 53, 1585-1610 (2004).
Stepanpol Polyols, "Evolution in Formulation: An Overview for North and South America", 2012, 7 pages.
White, "Reactions of Poly (phenylene Oxide)s with Quinones. I. The Quinone-Coupling Reaction Between Low-Molecular-Weight Poly (2,6-Dimethyl- 1,4-Phenylene Oxide) and 3,3',5,5'-Tetramethyl-4,4'-Diphenoquinone", Journal of Polymer Science: Polymer Chemistry Edition, vol. 19, 1981, pp. 1367-1383.
Fink Reactive Polymers Fundamentals and Applications: A Concise Guide to Industrial Polymers, Second Edition, Dec. 2013 (3 pages).
Non-Final Office Action dated Jun. 29, 2015; U.S. Appl. No. 14/032,254, filed Sep. 20, 2013 (16 pages).

THERMOPLASTIC POLYURETHANE AND ASSOCIATED METHOD AND ARTICLE

BACKGROUND OF THE INVENTION

Thermoplastic polyurethanes (TPUs) are prepared from diols and diisocyanates. See, e.g., D. Randall and S. Lee, "The Polyurethanes Book", New York: John Wiley & Sons, 2003; and K. Uhlig, "Discovering Polyurethanes", New York: Hanser Gardner, 1999. The isocyanate groups of the diisocyanate react with the hydroxyl groups on the diol to form a urethane linkage. The diol can be, for example, a low molecular weight polyether diol or polyester diol. The diisocyanate can be aliphatic or aromatic. The family of TPU resins is very complex because of the enormous variation in the compositional features of the diols and diisocyanates. This variety results in a large numbers of polymer structures and performance profiles. Indeed, TPUs can be rigid solids, or soft and elastomeric. TPUs are fully thermoplastic and can be melt-processed.

The generally recognized useful features of TPUs include high impact strength even at low temperatures, good abrasion resistance, good heat resistance, excellent resistance to non-polar solvents and fuels and oils, resistance to ozone and oxidation and humidity, and good electrical resistance. Less desirable features include high moisture absorption and lower rigidity at elevated temperatures.

There exists an opportunity for TPUs that exhibit improvements in one or more of reduced moisture absorption, increased heat resistance, and increased strength at high elongation.

BRIEF DESCRIPTION OF THE INVENTION

One embodiment is a thermoplastic polyurethane comprising: a plurality of poly(phenylene ether) repeat units having the structure

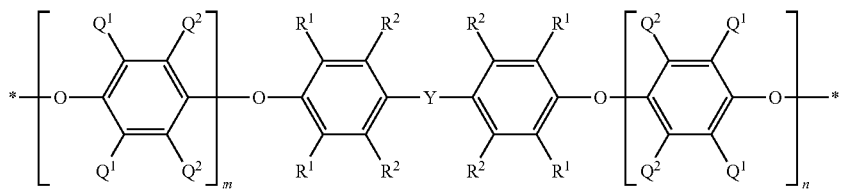

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; m and n are independently 0 to 20, provided that the sum of m and n is at least 3; and Y is selected from

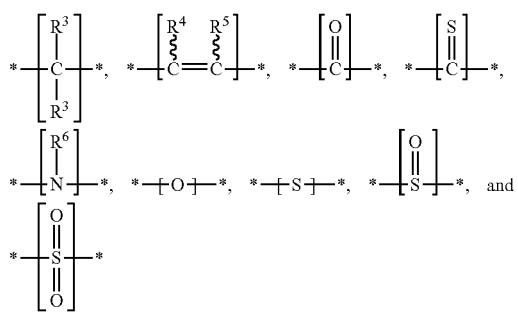

wherein each occurrence of $R^3$-$R^6$ is independently hydrogen or $C_1$-$C_{12}$ hydrocarbyl; and a plurality of diisocyanate residue repeat units having the structure

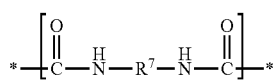

wherein $R^7$ is, independently in each repeat unit, $C_4$-$C_{18}$ hydrocarbyl; wherein at least one terminal oxygen atom of each poly(phenylene ether) repeat unit is covalently bonded to a terminal carbamoyl group of a diisocyanate residue repeat unit to form a urethane moiety.

Another embodiment is an article comprising the thermoplastic polyurethane.

Another embodiment is a method of forming a thermoplastic polyurethane, the method comprising: reacting a hydroxy-diterminated poly(phenylene ether) with an organic diisocyanate to form a thermoplastic polyurethane; wherein the hydroxy-diterminated poly(phenylene ether) has the structure

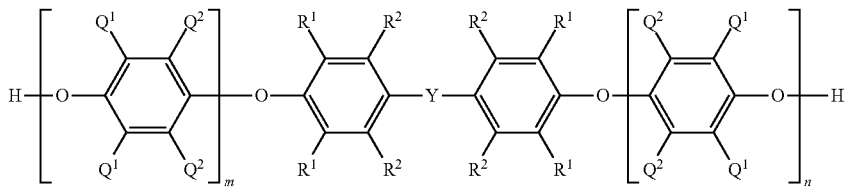

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; m and n are independently 0 to 20, provided that the sum of m and n is at least 3; and Y is selected from

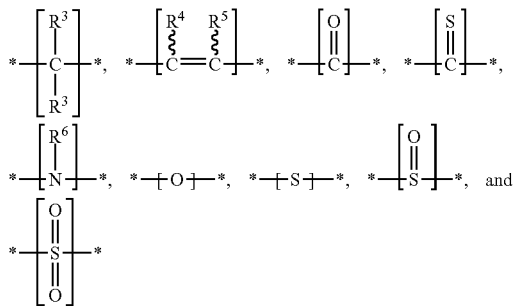

wherein each occurrence of $R^3$-$R^6$ is independently hydrogen or $C_1$-$C_{12}$ hydrocarbyl.

These and other embodiments are described in detail below.

DETAILED DESCRIPTION OF THE INVENTION

Figure 1:
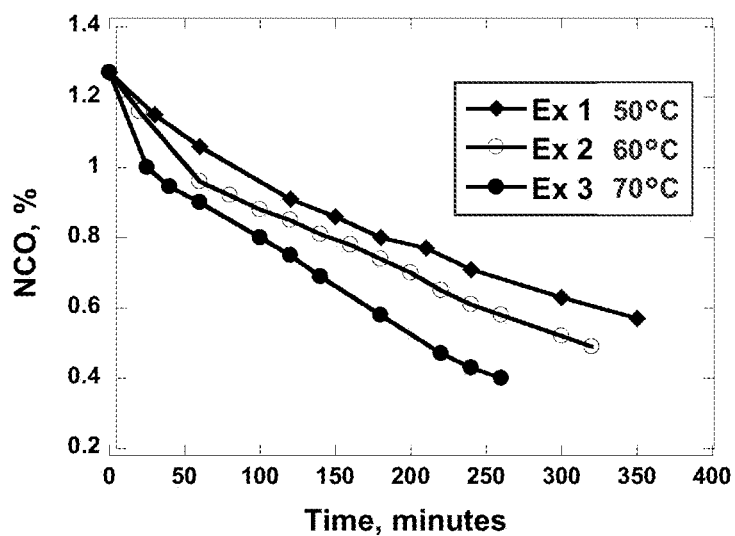
FIG. 1 is a plot of isocyanate concentration versus time for the reactions of Examples 1, 2, and 3.

The present inventor has prepared a thermoplastic polyurethane that incorporates specific poly(phenylene ether) segments and exhibits improvements in one or more of reduced moisture absorption, increased heat resistance, and increased strength at high elongation.

One embodiment is a thermoplastic polyurethane comprising: a plurality of poly(phenylene ether) repeat units having the structure

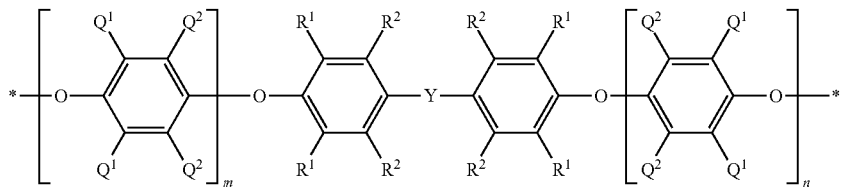

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; m and n are independently 0 to 20, provided that the sum of m and n is at least 3; and Y is selected from

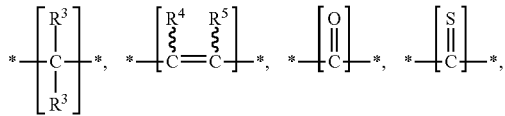

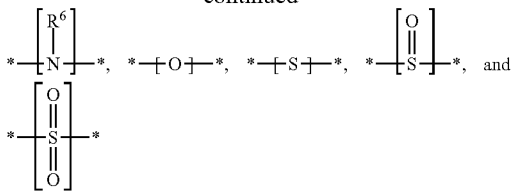

wherein each occurrence of $R^3$-$R^6$ is independently hydrogen or $C_1$-$C_{12}$ hydrocarbyl; and a plurality of diisocyanate residue repeat units having the structure

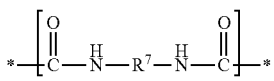

wherein $R^7$ is, independently in each repeat unit, $C_4$-$C_{18}$ hydrocarbyl; wherein at least one terminal oxygen atom of each poly(phenylene ether) repeat unit is covalently bonded to a terminal carbamoyl group of a diisocyanate residue to form a urethane moiety.

As used herein, the term "plurality" means at least three. The term "hydrocarbyl", whether used by itself, or as a prefix, suffix, or fragment of another term, refers to a residue that contains only carbon and hydrogen unless it is specifically identified as "substituted hydrocarbyl". The hydrocarbyl residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. When the hydrocarbyl residue is described as substituted, it can contain heteroatoms in addition to carbon and hydrogen. For example, $Q^1$ can be a di-n-butylaminomethyl group formed by reaction of a terminal 3,5-dimethyl-1,4-phenyl group with the di-n-butylamine component of an oxidative polymerization catalyst, In the poly(phenylene ether) repeat unit structure, each occurrence of $Q^1$ is independently halogen, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl, $C_1$-$C_{12}$ hydrocarbylthio; each occurrence of $Q^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl. In some embodiments, each occurrence of $Q^1$ is independently $C_1$-$C_{12}$ alkyl, especially methyl. In some embodiments, each occurrence of $Q^2$ is independently hydrogen or methyl.

Also in the poly(phenylene ether) repeat unit structure, each occurrence of $R^1$ and $R^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl. In some embodiments, each occurrence of $R^1$ is methyl, and each occurrence of $R^2$ is hydrogen. In general, m and n are independently 0 to 20, provided that the sum of m and n is at least 3. In some embodiments, the sum of m and n is 4 to 16. In general, Y is selected from

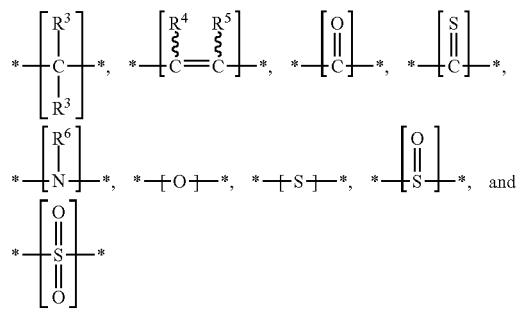

wherein each occurrence of $R^3$-$R^6$ is independently hydrogen or $C_1$-$C_{12}$ hydrocarbyl. In some embodiments Y is

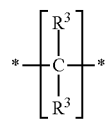

wherein each occurrence of $R^3$ is independently hydrogen or $C_1$-$C_6$ alkyl. In some embodiments, each occurrence of $R^3$ is methyl.

In some embodiments, the poly(phenylene ether) repeat unit has the structure

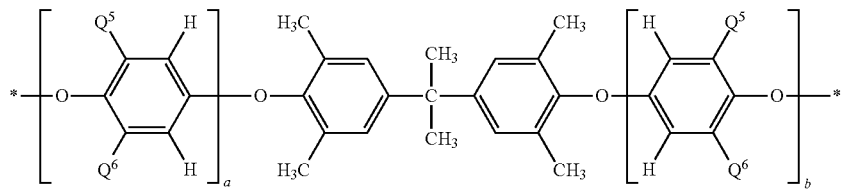

wherein each occurrence of $Q^5$ and $Q^6$ is independently methyl or di-n-butylaminomethyl; and each occurrence of a and b is independently 0 to 20, provided that the sum of a and b is at least 3. In some embodiments, the sum of a and b is 4 to 16.

In addition to the poly(phenylene ether) units, the thermoplastic polyurethane comprises a plurality of diisocyanate residue repeat units having the structure

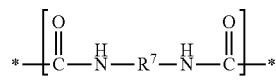

wherein $R^7$ is, independently in each repeat unit, $C_4$-$C_{18}$ hydrocarbyl. The diisocyanate residue repeat units are the residue of the organic diisocyanate reactant, many examples of which are described below. In some embodiments, each diisocyanate residue repeat unit independently has a structure selected from

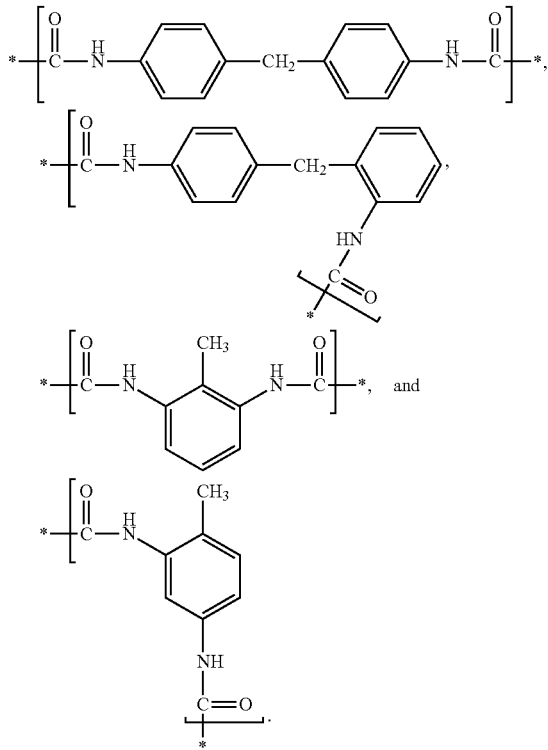

At least one terminal oxygen atom of each poly(phenylene ether) repeat unit is covalently bonded to a terminal carbamoyl group of a diisocyanate residue repeat unit to form a urethane moiety (—O—C(=O)—NH—). An example of such a urethane linkage between a poly(phenylene ether) repeat unit and a diisocyanate residue repeat unit is illustrated by the structure below

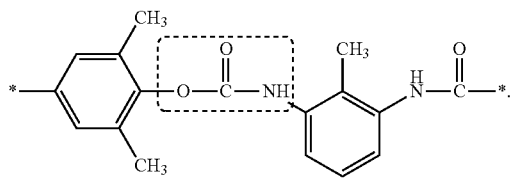

In addition to the poly(phenylene ether) repeats units and the diisocyanate residue repeat units, the thermoplastic polyurethane can, optionally, further comprise a plurality of diol repeat units. The diol repeat units are distinct from the poly(phenylene ether) repeats units. Each diol repeat unit can be the residue of an alkylene diol, an alkylene ether diol, a polyether diol, an alkoxylate of an aromatic diol, or a polyester diol.

Examples of alkylene diols include 1,2-ethandiol (ethylene glycol), 1,2-propanediol (propylene glycol), 1,4-butanediol, 2-ethyl-1,3-hexanediol, 1,3-butanediol, 2-butyl-2-ethyl-1,3-propanediol, 2,4-diethyl-1,5-pentanediol, ethylene glycol, 1,3-propanediol, 2,3-butanediol, 1,5-pentanediol, 1,6-hexanediol, 2,2,4-trimethyl-1,3-pentanediol, and combinations thereof.

Examples of alkylene ether diols include diethylene glycol, triethylene glycol, tetraethylene glycol, dipropylene glycol, tripropylene glycol, tetrapropylene glycol, dibutylene glycol, tributylene glycol, tetrabutylene glycol, and combinations thereof.

Examples of polyether diols include polyethylene ether diols, polypropylene ether diols, polybutylene glycols, polytetramethylene ether diols, ethylene oxide capped polypropylene oxides, and combinations thereof.

Examples of alkoxylates of aromatic diols include ethoxylated and propoxylated derivatives of hydroquinone, resorcinol, catechol, 1,1-bis(3,5-dimethyl-4-hydroxyphenyl)ethane, 1,1-bis(3-chloro-4-hydroxyphenyl)ethane, 1,1-bis(3-methyl-4-hydroxyphenyl)-ethane, 1,2-bis(4-hydroxy-3,5-dimethylphenyl)-1,2-diphenylethane, 1,2-bis(3-methyl-4-hydroxyphenyl)-1,2-diphenylethane, 1,2-bis(3-methyl-4-hydroxyphenyl)ethane, 2,2'-binaphthol, 2,2'-biphenol, 2,2'-dihydroxy-4,4'-dimethoxybenzophenone, 2,2'-dihydroxy-4-methoxybenzophenone, 2,2'-dihydroxybenzophenone, 2,2-bis(3,5-dichloro-4-hydroxyphenyl)propane, 2,2-bis(3-bromo-4-hydroxyphenyl)propane, 2,2-bis(3-phenyl-4-hydroxyphenyl)propane, 2,2-bis(3-methyl-4-hydroxyphenyl)propane, 2,2-bis(3,5-dimethyl-4-hydroxyphenyl)propane, 1,1-bis(3,5-dimethyl-4-hydroxyphenyl)-1-phenylethane, 1,1-bis(3-chloro-4-hydroxyphenyl)-1-phenylethane, 1,1-bis(3-methyl-4-hydroxyphenyl)-1-phenylethane, 2,2-bis(4-hydroxy-3,5-dimethyl phenyl)-1-phenylpropane, 2,2-bis(4-hydroxy-3,5-dimethyl phenyl)hexane, 2,2-bis(4-hydroxy-3,5-dimethylphenyl)pentane, 2,2-bis(3-methyl-4-hydroxynaphthyl)propane, 2,2-bis(3-methyl-4-hydroxyphenyl)-1-phenylpropane, 2,2-bis(3-methyl-4-hydroxyphenyl)hexane, 2,2-bis(3-methyl-4-hydroxyphenyl)pentane, 2,2'-methylenebis(4-methylphenol), 2,2'-methylenebis[4-methyl-6-(1-methylcyclohexyl)phenol], 3,3',5,5'-tetramethyl-4,4'-biphenol, 3,3'-dimethyl-4,4'-biphenol, bis(2-hydroxyphenyl)-methane, bis(4-hydroxy-2,6-dimethyl-3-methoxyphenyl)methane, bis(3,5-dimethyl-4-hydroxyphenyl)methane, bis(3-methyl-4-hydroxyphenyl)methane, bis-(4-hydroxy-3,5-dimethyl phenyl)cyclohexylmethane, bis(4-hydroxy-3,5-dimethyl phenyl)phenylmethane, bis(3-methyl-4-hydroxyphenyl)cyclohexylmethane, bis(3-methyl-4-hydroxyphenyl)methane, bis(3,5-dimethyl-4-hydroxyphenyl)methane, bis(3-methyl-4-hydroxyphenyl)phenylmethane, 2,2',3,3',5,5'-hexamethyl-4,4'-biphenol, octafluoro-4,4'-biphenol, 2,3,3',5,5'-pentamethyl-4,4'-biphenol, 1,1-bis(3,5-dibromo-4-hydroxyphenyl)cyclohexane 1,1-bis(3,5-dimethyl-4-hydroxyphenyl)cyclohexane, bis(3-methyl-4-hydroxyphenyl)cyclohexane, tetrabromobiphenol, tetrabromobisphenol A, tetrabromobisphenol S, 2,2'-diallyl-4,4'-bisphenol A, 2,2'-diallyl-4,4'-bisphenol S, 3,3',5,5'-tetramethyl-4,4'-bisphenol sulfide, 3,3'-dimethyl bisphenol sulfide, and 3,3',5,5'-tetramethyl-4,4'-bisphenolsulfone.

Examples of polyester diols include aliphatic polyester diols (sometimes called aliphatic polyester polyols), aromatic polyester diols (sometimes called aromatic polyester polyols), and polycaprolactone diols. It will be understood that aromatic polyester diols include aromatic repeat units and can, optionally, further include aliphatic repeat units, as in poly(ethylene terephthalate) and poly(butylene terephthalate).

Since unreacted groups at the end of the polymer chain can undergo additional reactions during melt processing the thermoplastics polyurethane, a monohydric phenol or a monohydric alcohol or a monoisocyanate can be used to end-cap the polymer to control molecular weight and give more stable material.

The weight percent of poly(phenylene ether) repeat units and diisocyanate residue repeat units in the thermoplastic polyurethane will depend on the molecular weights of the hydroxy-diterminated poly(phenylene ether) and the organic diisocyanate from which the thermoplastic polyurethane is formed. In general, the thermoplastic polyurethane will comprise 5 to 95 weight percent of the poly(phenylene ether) repeat units, and 5 to 40 weight percent of the diisocyanate residue repeat units, based on the weight of the thermoplastic polyurethane. The thermoplastic polyurethane can, optionally, further comprise 5 to 70 weight percent of diol repeat units, each diol repeat unit comprising the residue of an alkylene diol, an alkylene ether diol, a polyether diol, an alkoxylate of an aromatic diol, or a polyester diol.

In some embodiments, the thermoplastic polyurethane has a weight average molecular weight of 10,000 to 250,000 atomic mass units, specifically 50,000 to 250,000 atomic mass units.

In a very specific embodiment of the thermoplastic polyurethane, the poly(phenylene ether) repeat units have the structure

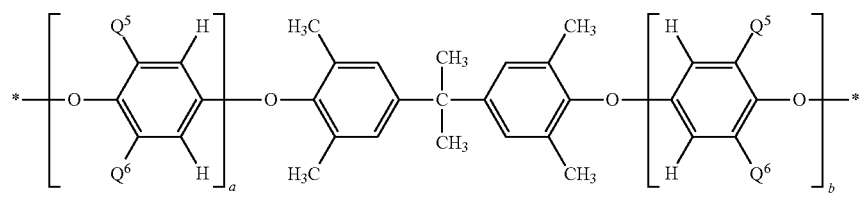

wherein each occurrence of $Q^5$ and $Q^6$ is independently methyl or di-n-butylaminomethyl; and each occurrence of a and b is independently 0 to 20, provided that the sum of a and b is at least 3; the diisocyanate residue repeat units have a structure selected from

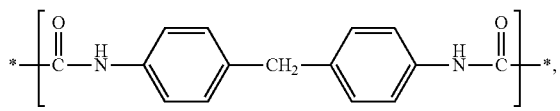

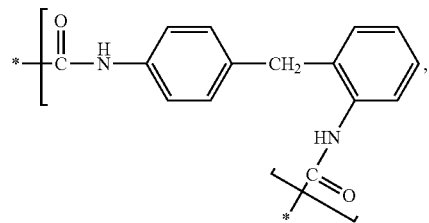

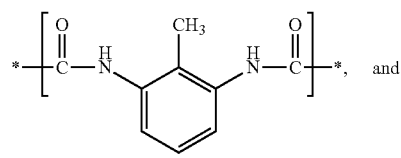, and

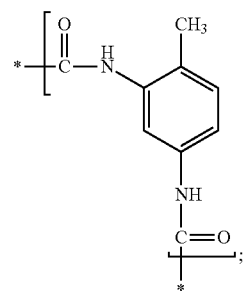

and the thermoplastic polyurethane further comprises a plurality of diol repeat units, each diol repeat unit comprising the residue of an alkylene diol, an alkylene ether diol, a polyether diol, an alkoxylate of an aromatic diol, or a polyester diol.

The invention includes articles formed from the thermoplastic polyurethane. Suitable methods of forming such articles include single layer and multilayer sheet extrusion, injection molding, blow molding, film extrusion, profile extrusion, pultrusion, compression molding, thermoforming, pressure forming, hydroforming, vacuum forming, and the like. Combinations of the foregoing article fabrication methods can be used. In some embodiments, the article is formed by injection molding or profile extrusion. Examples are articles that can be formed by extrusion include cable sheathing, spiral tubing, pneumatic tubing, blow molded bellows, and films Examples of articles that can be formed by injection molding include ski boot shells, sport shoe soles, caster tires, automotive body panels, and automotive rocker panels.

The invention includes a method of forming a thermoplastic polyurethane, the method comprising: reacting a hydroxy-diterminated poly(phenylene ether) with an organic diisocyanate to form a thermoplastic polyurethane; wherein the hydroxy-diterminated poly(phenylene ether) has the structure

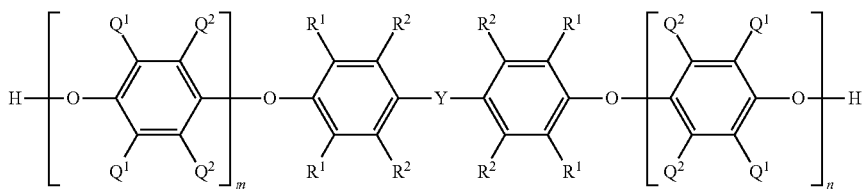

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; m and n are independently 0 to 20, provided that the sum of m and n is at least 3; and Y is selected from

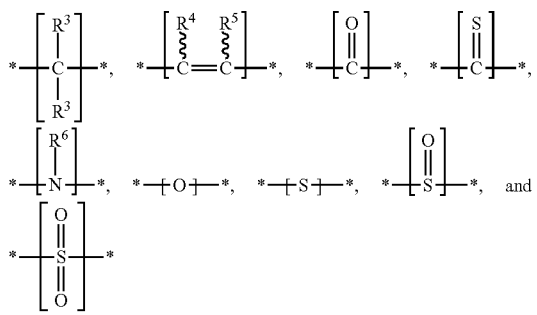

wherein each occurrence of $R^3$-$R^6$ is independently hydrogen or $C_1$-$C_{12}$ hydrocarbyl; and wherein the organic diisocyanate has the structure

O=C=N—$R^7$—N=C=O wherein $R^7$ is $C_4$-$C_{18}$ hydrocarbylene.

All of the structural variations described above for the poly(phenylene ether) repeat units apply as well to the hydroxy-diterminated poly(phenylene ether)s from which they are derived. Methods of preparing hydroxy-diterminated poly(phenylene ether)s are known. For example, they can be prepared by copolymerization of a monohydric phenol and a dihydric phenol as described, for example, in U.S. Pat. No. 7,541,421 to Carrillo et al. Hydroxy-diterminated poly(phenylene ether)s are also commercially available as, for example, PPO™ SA90 resin from Sabic Innovative Plastics.

Examples of organic diisocyanates that can be used in the reaction include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, and cyclohexane-1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha',alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, and mixtures thereof. In some embodiments, the diisocyanate comprises 1,6-hexamethylene diisocyanate, 1-isocyanato-3-isocyanatomethyl-3,5,5-trimethylcyclohexane (isophorone diisocyanate or IPDI), bis-(4-isocyanatocyclohexyl)methane, alpha,alpha,alph',alpha'-tetramethyl-1,3-xylylene diisocyanate, alpha,alpha,alph',alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 2,4-toluene diisocyanate, 2,6-toluoylene diisocyanate, 2,4-diphenylmethane diisocyanate, 4,4'-diphenylmethane diisocyanate, 3,3-dimethyl-4,4-biphenyldiisocyanate, naphthalene-1,5-diisocyanate, 1-isocyanato-3-isocyanatomethyl-3,5,5-trimethylcylohexane, polyphenylene diisocyanate, or a mixture thereof.

As described above, the organic diisocyanate can be reacted with a diol in addition to the hydroxy-diterminated poly(phenylene ether). The diol is selected from alkylene diols, alkylene ether diols, polyether diols, alkoxylates of aromatic diols, polyester diols, and combinations thereof.

The organic diisocyanate can, optionally, be reacted with a diamine in addition to the hydroxy-diterminated poly(phenylene ether). Specific diamines include, for example, toluenediamines, dimethylthiotoulenediamines, 3,5-diethyltoluene-2,4-diamine, 3,5-diethyltoluene-2,6-diamine, methylenebis(2,6-diethylaniline), and combinations thereof. When a diamine is employed, the product polyurethane comprises repeating units in which each amine group has reacted with an isocyanate group to form a urea moiety.

Reacting the organic diisocyanate with the hydroxy-diterminated poly(phenylene ether) and, optionally, the diol, yields a linear thermoplastic polyurethane. If a branched or crosslinked polyurethane is desired, a poly(phenylene ether) having more than two hydroxy groups and/or an isocyanate compound having more than two isocyanate groups and/or a polyol having at least three hydroxyl groups can be employed.

As illustrated in the working examples below, reacting the hydroxy-diterminated poly(phenylene ether) with the organic diisocyanate can be conducted in the absence of a catalyst. Alternatively, and also as illustrated in the working examples below, the reaction can be conducted in the presence of a catalyst. Suitable catalysts include tertiary amines and metal compounds based on tin, bismuth, and zinc. Tertiary amine catalysts include triethylenediamine (TEDA, 1,4-diazabicyclo[2.2.2]octane or DABCO), dimethylcyclohexylamine (DMCHA), dimethylethanolamine (DMEA), and N-ethylmorpholine. Specific metal compounds include bismuth and zinc carboxylates, organotin compounds (including dibutyltin dilaurate and tin carboxylates such as stannous octoate), oxides of tin, bismuth and zinc, and mercaptides of tin, bismuth, and zinc.

Reacting the hydroxy-diterminated poly(phenylene ether) with the organic diisocyanate can be conducted in the presence of a solvent. Suitable solvents include aromatic solvents, such as toluene, ethylbenzene, xylenes, anisole, chlorobenzene, dichlorobenzenes, and combinations thereof.

Alternatively, reacting the hydroxy-diterminated poly(phenylene ether) with the organic diisocyanate can be conducted in the absence of a solvent, that is, in bulk.

In a very specific embodiment of the method of forming a thermoplastic polyurethane, the hydroxy-diterminated poly(phenylene ether) has the structure

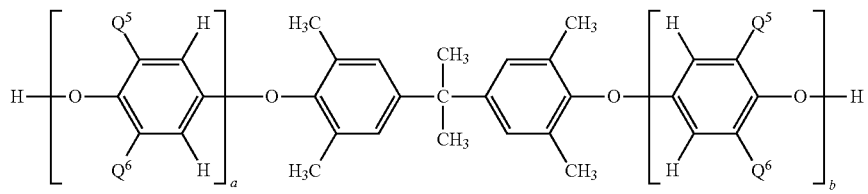

wherein each occurrence of $Q^5$ and $Q^6$ is independently methyl or di-n-butylaminomethyl, and each occurrence of a and b is independently 0 to 20, provided that the sum of a and b is at least 3; the organic diisocyanate is selected from the group consisting of 2,4'-diphenylmethane diisocyanate, 4,4'-diphenylmethane diisocyanate, toluene 2,6-diisocyanate, toluene 2,4-diisocyanate, and combinations thereof; and the method comprises reacting the organic diisocyanate with the hydroxy-diterminated poly(phenylene ether) and a diol selected from the group consisting of alkylene diols, alkylene ether diols, polyether diols, alkoxylates of aromatic diols, polyester diols, and combinations thereof.

All ranges disclosed herein are inclusive of the endpoints, and the endpoints are independently combinable with each other.

The invention includes at least the following embodiments.

Embodiment 1

A thermoplastic polyurethane comprising: a plurality of poly(phenylene ether) repeat units having the structure

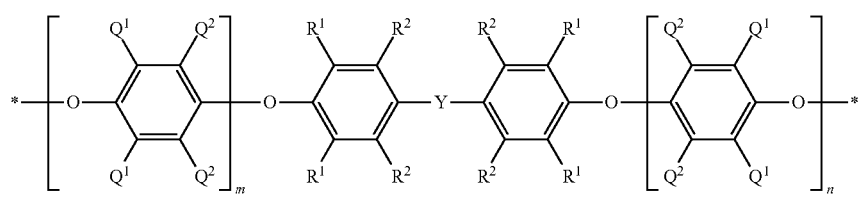

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; m and n are independently 0 to 20, provided that the sum of m and n is at least 3; and Y is selected from

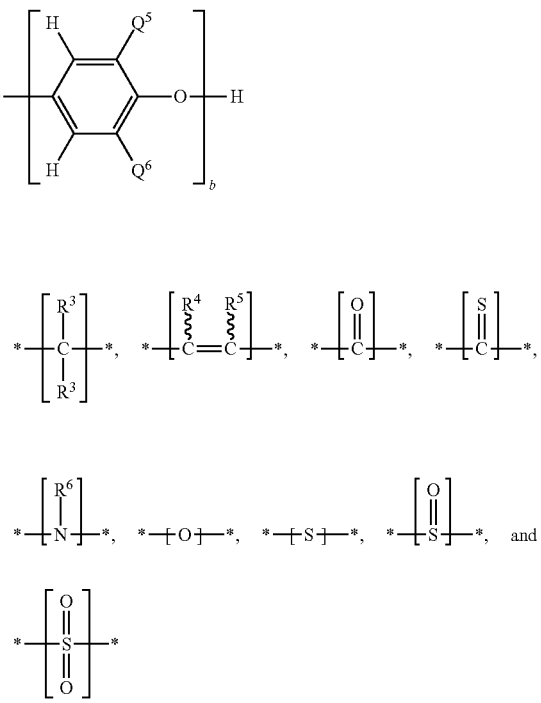

wherein each occurrence of $R^3$-$R^6$ is independently hydrogen or $C_1$-$C_{12}$ hydrocarbyl; and a plurality of diisocyanate residue repeat units having the structure

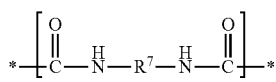

wherein $R^7$ is, independently in each repeat unit, $C_4$-$C_{18}$ hydrocarbyl; wherein at least one terminal oxygen atom of each poly(phenylene ether) repeat unit is covalently bonded to a terminal carbamoyl group of a diisocyanate residue repeat unit to form a urethane moiety.

Embodiment 2

The thermoplastic polyurethane of embodiment 1, wherein the poly(phenylene ether) repeat units have the structure

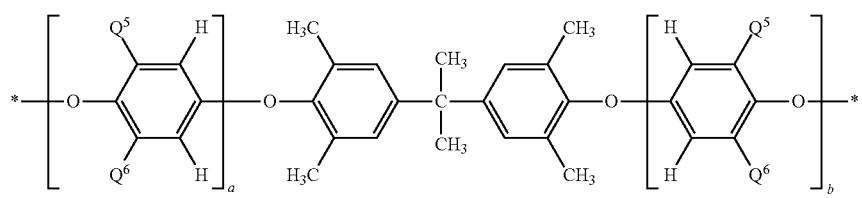

wherein each occurrence of $Q^5$ and $Q^6$ is independently methyl or di-n-butylaminomethyl; and each occurrence of a and b is independently 0 to 20, provided that the sum of a and b is at least 3.

Embodiment 3

The thermoplastic polyurethane of embodiment 1 or 2, wherein each diisocyanate residue repeat units independently has a structure selected from

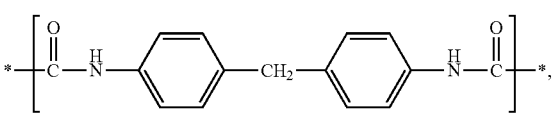

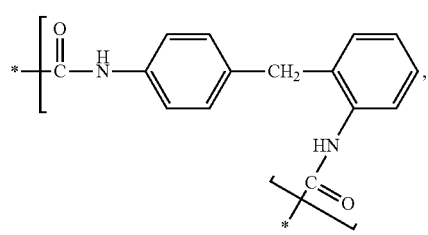

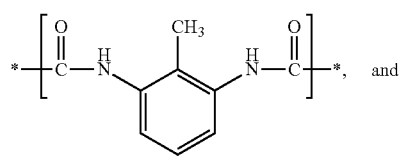, and

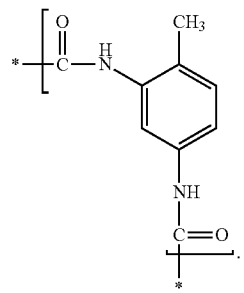

Embodiment 4

The thermoplastic polyurethane of any of embodiments 1-3, further comprising a plurality of diol repeat units, each diol repeat unit comprising the residue of an alkylene diol, an alkylene ether diol, a polyether diol, an alkoxylate of an aromatic diol, or a polyester diol.

Embodiment 5

The thermoplastic polyurethane of any of embodiments 1-3, comprising 5 to 95 weight percent of the poly(phenylene ether) repeat units, and 5 to 40 weight percent of the diisocyanate residue repeat units.

Embodiment 6

The thermoplastic polyurethane of embodiment 5, further comprising 5 to 70 weight percent of diol repeat units, each diol repeat unit comprising the residue of an alkylene diol, an alkylene ether diol, a polyether diol, an alkoxylate of an aromatic diol, or a polyester diol.

Embodiment 7

The thermoplastic polyurethane of any of embodiments 1-6, having a weight average molecular weight of 10,000 to 250,000 atomic mass units.

Embodiment 8

The thermoplastic polyurethane of embodiment 1, wherein the poly(phenylene ether) repeat units have the structure

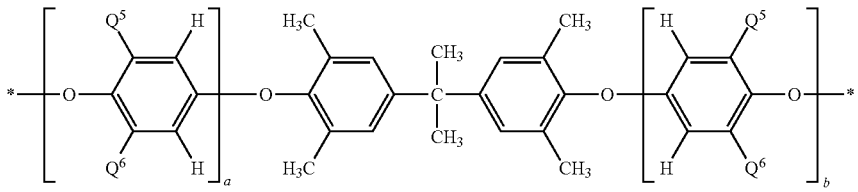

wherein each occurrence of $Q^5$ and $Q^6$ is independently methyl or di-n-butylaminomethyl; and each occurrence of a and b is independently 0 to 20, provided that the sum of a and b is at least 3; wherein the diisocyanate residue repeat units have a structure selected from

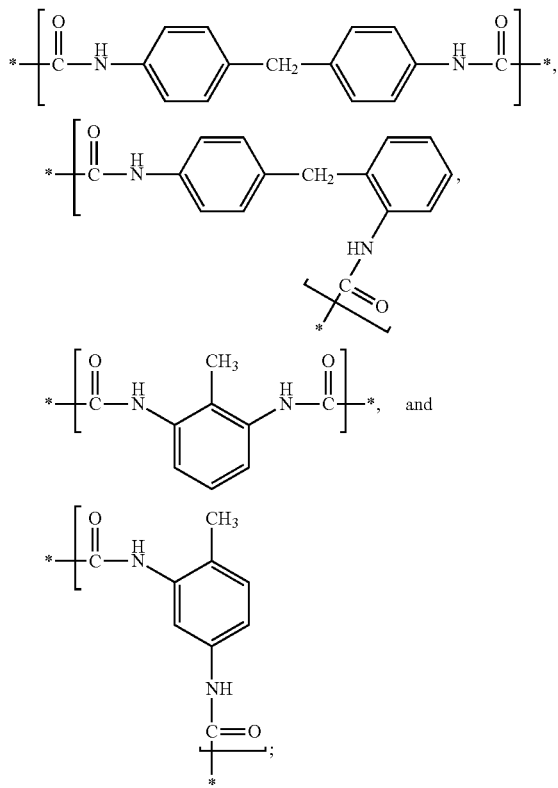

and wherein the thermoplastic polyurethane further comprises a plurality of diol repeat units, each diol repeat unit comprising the residue of an alkylene diol, an alkylene ether diol, a polyether diol, an alkoxylate of an aromatic diol, or a polyester diol.

Embodiment 9

An article comprising a thermoplastic polyurethane comprising: a plurality of poly(phenylene ether) repeat units having the structure

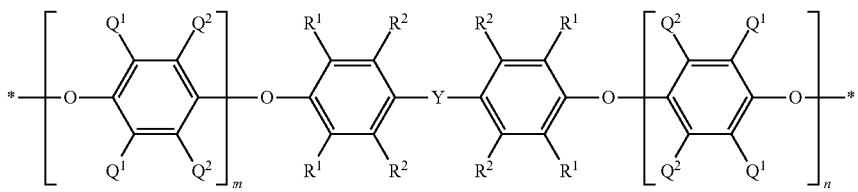

wherein each occurrence of $Q^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $Q^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $R^1$ and $R^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; m and n are independently 0 to 20, provided that the sum of m and n is at least 3; and Y is selected from -continued

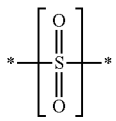

wherein each occurrence of $R^3$-$R^6$ is independently hydrogen or $C_1$-$C_{12}$ hydrocarbyl; and a plurality of diisocyanate residue repeat units having the structure

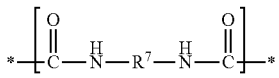

wherein $R^7$ is, independently in each repeat unit, $C_4$-$C_{18}$ hydrocarbyl; wherein at least one terminal oxygen atom of each poly(phenylene ether) repeat unit is covalently bonded to a terminal carbamoyl group of a diisocyanate residue repeat unit to form a urethane moiety.

Embodiment 10

The article of embodiment 9, wherein the article is selected from the group consisting of films, cable sheathing, spiral tubing, pneumatic tubing, blow molded bellows, ski boot shells, sport shoe soles, caster tires, automotive body panels, and automotive rocker panels.

Embodiment 11

A method of forming a thermoplastic polyurethane, the method comprising: reacting a hydroxy-diterminated poly (phenylene ether) with an organic diisocyanate to form a thermoplastic polyurethane; wherein the hydroxy-diterminated poly(phenylene ether) has the structure

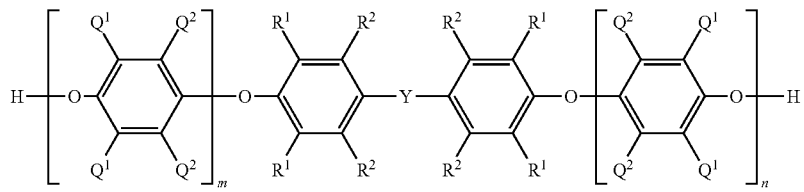

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; m and n are independently 0 to 20, provided that the sum of m and n is at least 3; and Y is selected from

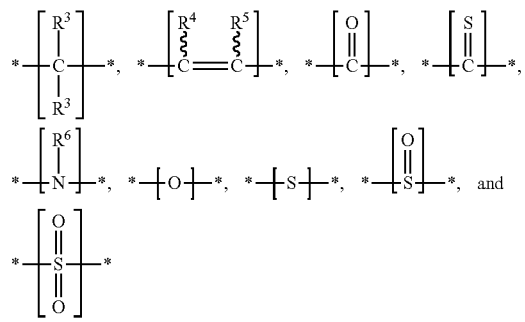

wherein each occurrence of $R^3$-$R^6$ is independently hydrogen or $C_1$-$C_{12}$ hydrocarbyl; and wherein the organic diisocyanate has the structure

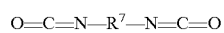

wherein $R^7$ is $C_4$-$C_{18}$ hydrocarbylene.

Embodiment 12

The method of embodiment 11, comprising reacting the organic diisocyanate with the hydroxy-diterminated poly (phenylene ether) and a diol selected from the group consisting of alkylene diols, alkylene ether diols, polyether diols, alkoxylates of aromatic diols, polyester diols, and combinations thereof.

Embodiment 13

The method of embodiment 11 or 12, wherein said reacting is conducted in the absence of a catalyst.

Embodiment 14

The method of embodiment 11 or 12, wherein said reacting is conducted in the presence of a catalyst.

Embodiment 15

The method of any of embodiments 11-14, wherein said reacting is conducted in the absence of solvent.

Embodiment 16

The method of embodiment 11, wherein the hydroxy-diterminated poly(phenylene ether) has the structure

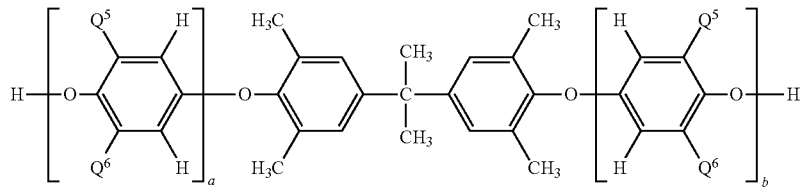

wherein each occurrence of $Q^5$ and $Q^6$ is independently methyl or di-n-butylaminomethyl, and each occurrence of a and b is independently 0 to 20, provided that the sum of a and b is at least 3; wherein the organic diisocyanate is selected from the group consisting of 2,4'-diphenylmethane diisocyanate, 4,4'-diphenylmethane diisocyanate, toluene 2,6-diisocyanate, toluene 2,4-diisocyanate, and combinations thereof and wherein the method comprises reacting the organic diisocyanate with the hydroxy-diterminated poly(phenylene ether) and a diol selected from the group consisting of alkylene diols, alkylene ether diols, polyether diols, alkoxylates of aromatic diols, polyester diols, and combinations thereof.

The invention is further illustrated by the following non-limiting examples.

Materials and Methods

Reagents used in the synthesis of thermoplastic polyurethanes are summarized in Table 1.

TABLE 1

| Reagent | Description |
|---|---|
| PPE-OH$_2$ 0.06 | Copolymer of 2,6-dimethylphenol and 2,2-bis(3,5-dimethyl-4-hydroxyphenyl)propane, CAS Reg. No. 1012321-47-9, having an intrinsic viscosity of 0.06 deciliter per gram, a hydroxyl-equivalent weight of 681 grams/mole; titration of hydroxyl groups required 82.4 milligrams potassium hydroxide per gram of oligomer; preparable according to the procedure of Example 4 of U.S. Pat. No. 7,541,421. |
| PPE-OH$_2$ 0.09 | Copolymer of 2,6-dimethylphenol and 2,2-bis(3,5-dimethyl-4-hydroxyphenyl)propane, CAS Reg. No. 1012321-47-9, having an intrinsic viscosity of 0.09 deciliter per gram, a hydroxyl-equivalent weight of 924 grams/mole; titration of hydroxyl groups required 60.7 milligrams potassium hydroxide per gram of oligomer; available as PPO ™ SA90 resin from Sabic Innovative Plastics. |
| PPE-OH$_2$ 0.12 | Copolymer of 2,6-dimethylphenol and 2,2-bis(3,5-dimethyl-4-hydroxyphenyl)propane, CAS Reg. No. 1012321-47-9, having an intrinsic viscosity of 0.12 deciliter per gram, a hydroxyl-equivalent weight of 1597 grams/mole; titration of hydroxyl groups required 35.1 milligrams potassium hydroxide per gram of oligomer; preparable according to the procedure of Example 1 of U.S. Pat. No. 7,541,421. |
| Polyether diol 1 | Poly(oxytetramethylene) glycol, CAS Reg. No. 25190-06-1, having a hydroxyl equivalent weight of 524.8; titration of hydroxyl groups required 106.9 milligrams potassium hydroxide per gram glycol; available as TERATHANE ™ 1000 from Invista. |
| Polyether diol 2 | Ethylene oxide-capped oxypropylated polyether diol; titration of hydroxyl groups required 56.7 milligrams potassium hydroxide per gram diol; available as Poly-G-55-56 from Arch Chemicals. |
| Polyester diol 1 | Poly(butylene adipate) polyester diol, CAS Reg. No. 25103-87-1, having a hydroxyl equivalent weight of 1,003; titration of hydroxyl groups required 55.9 milligrams potassium hydroxide per gram diol; available as Poly S 2000BA from itwc inc. |
| Polyester diol 2 | Ortho phthalate-diethylene glycol-based aromatic polyester polyol, CAS Reg. No. 32472-85-8, having a hydroxyl equivalent weight of 323.6; titration of hydroxyl groups required 173.37 milligrams potassium hydroxide per gram diol; available as STEPANPOL ™ PS 1752 from Stepan. |
| 2,4'-/4,4'-MDI | A mixture of 2,4'-diphenylmethane diisocyanate, CAS Reg. No. 5873-54-1, and 4,4'-diphenylmethane diisocyanate, CAS Reg. No. 101-68-8, having an isocyanate (NCO) content of 33.4%; available as MONDUR ™ MLQ from Bayer. |
| 4,4'-MDI | 4,4'-diphenylmethane diisocyanate, CAS Reg. No. 101-68-8, having an isocyanate (NCO) content of 33.6%; available as MONDUR ™ M from Bayer. |
| TDI | A mixture of toluene 2,6-diisocyanate, CAS Reg. No. 91-08-7, and toluene 2,4-diisocyanate, CAS Reg. No. 584-84-9, having an isocyanate (NCO) content of 47.98%; available as LUPRANATE ™ T80 from BASF. |
| HQEE | Hydroquinone bis(2-hydroxyethyl) ether, CAS Reg. No. 104-38-1, having a hydroxyl equivalent weight of 99.1; available Sigma-Aldrich. |

TABLE 1-continued

| Reagent | Description |
|---|---|
| BD | 1,4-Butanediol, CAS Reg. No. 110-63-4, having a hydroxyl equivalent weight of 45; available from Alfa Aesar. |
| Amine curative | A mixture of aromatic diamines consisting primarily of 3,5-diethyltoluene-2,4-diamine, CAS Reg. No. 2095-02-5, and 3,5-diethyltoluene-2,6-diamine, CAS Reg. No. 2095-01-4; having an amine equivalent weight of 81.9; available as ETHACURE™ 100 from Albemarle Corp. |
| Dibutyltin dilaurate | Dibutyltin dilaurate (catalyst), CAS Reg. No. 77-58-7; available as DABCO™ T-12 from Air Products. |

The following test methods were used to characterize the thermoplastic polyurethanes.

Physico-mechanical properties. Shore A and Shore D hardness values, which are unitless, were determined at 23° C. according to ASTM D 2240-05 (2010). Tensile strength values, expressed in units of megapascals, and tensile elongation values, expressed in units of percent, were determined at 23° C. according to ASTM D 412-06a(2013), Test Method A, using an Instron Universal Tester, Model 1122 and a test speed of 50.8 centimeters/minute (20 inches/minute). Tear strength values, expressed in units of Newtons/centimeter, were determined at 23° C. according to ASTM D 624-00 (2012), using an Instron Universal Tester, Model 1122, Die C, and a test speed of 50.8 centimeters/minute (20 inches/minute). Compression set values, expressed in units of percent, were determined at 23° C. according to ASTM D 395-03 (2008). Bayshore resilience values, expressed in units of percent, were determined at 23° C. according to ASTM D 2632-01 (2008). Taber abrader test weight loss values, expressed in units of percent, was determined using a Taber Abrader, 2000 cycles, CALIBRADE™ H-22 abrasion wheels, and a 500 gram weight.

Morphology and thermal properties. Glass transition temperature ($T_g$) values, expressed in units of degrees centigrade, were determined according to ASTM D 3418-12e1 using a TA Instruments DSC Q10 and a thermal cycle with equilibration at −80° C. followed by heating at 20° C./minute to 200° C. Glass transition temperature was also determined by Dynamic Mechanical Analysis (DMA) using a TA Instruments DMA 2980, a nitrogen atmosphere, a temperature range of −80 to 130° C., a heating rate of 3° C./minute, and a frequency of 10 hertz. Coefficient of Thermal Expansion (CTE) values, expressed in units of micrometer/meter-° C., were determined by Thermomechanical Analysis (TMA) using a TA Instruments TMA Q400, a nitrogen atmosphere, a temperature range of −80 to 130° C., and a heating rate of 10° C./minute. Heat resistance was estimated by measuring tensile properties at 50 and 70° C. Thermal and oxidative stability were estimated by determining the change in tensile stress-strain properties and glass transition temperature after exposure to 100° C. for seven days in an air atmosphere. Dielectric Constant and Dissipation Factor, both unitless, were determined using parallel plates on a 76A 1 Megahertz Automatic Capacitance Bridge (Boonton Electronics, Model 76A).

Solvent resistance and hydrolytic stability. Acid resistance was determined by immersing a sample for three days immersion in pH 1 hydrochloric acid at 23° C. and expressed as a post-test sample weight (%) relative to pre-test sample weight of 100%. Base resistance was determined by immersing a sample for three days in pH 13 sodium hydroxide at 23° C. and expressed as a post-test sample weight (%) relative to pre-test sample weight of 100%. Solvent resistance was determined by immersing a sample for three days in toluene, methyl ethyl ketone (MEK), or Mobil Vacuum Pump Oil (SAE Grade 20, ISO Viscosity Grade 68) at 23° C. and expressed as a post-test sample weight (%) relative to pre-test sample weight of 100%. Water absorption was determined by the percent weight change after seven days exposure to 50° C., 100% relative humidity air.

Weight average molecular weight ($M_w$) and number average molecular weight ($M_n$), each expressed in atomic mass units (amu), were determined using an Agilent 1100 Series HPLC System with two Phenomenex PHENOGEL™ 5 micrometer Linear columns and a UV detector. Chloroform with 50 parts per million dibutyl amine was the eluent. The injection volume was 50 microliters. Molecular weight values were uncorrected from polystyrene standards.

Weight percent char was determined using a TGA Perkin Elmer Pyris 1. The samples were heat from 50 to 800° C. at 20 degrees per minute in air and nitrogen. The residue at 600, 700, and 800° C. was the percent char.

Kinetics of polyurethane formation. Kinetic data on the reaction of PPE-OH$_2$ 0.09 with 4,4'-MDI were determined at 50° C., 60° C., and 70° C. The kinetic measurement for the reaction of PPE-OH$_2$ 0.09 with 4,4'-MDI was carried out in a three necked 300 milliliter cylindrical flask equipped with a magnetic stirrer, reflux condenser, thermocouple, and nitrogen inlet. The reaction flask was heated via a heating mantle equipped with a temperature controller. The reaction temperature was maintained during reactions at ±1° C.

PPE-OH$_2$ 0.09 (0.039 equivalents) was pre-dissolved in 95 milliliters of dry toluene at room temperature with stirring on a stirrer plate. The PPE-OH$_2$ 0.09 was added incrementally in small portions to toluene over one hour. The resulting homogeneous toluene solution of PPE-OH$_2$ 0.09 was transferred into a volumetric cylinder and adjusted to a total volume of 100 milliliters by adding dry toluene. This solution was transferred into a reaction flask and heated while mixing to a desired temperature under continuous flow of nitrogen. 4,4'-MDI (0.045 equivalents), which was previously preheated at 80° C., was weighed into a 25 milliliter volumetric flask and toluene was added up to 25 milliliter mark, mixed thoroughly to homogenize and heated to temperature of the reaction. Once the temperature in the reaction flask reached a desired temperature, the solution of diisocyanate was added via funnel to the solution of PPE-OH$_2$ 0.09. The time when approximately half of the solution was added to the flask was taken as the starting time of reaction. At certain time intervals, samples of the reaction solution were removed and isocyanate content determined via di-n-butyl amine titration (according to the ASTM D 5155-10 test method).

Example 1

Kinetic data for the reaction of PPE-OH$_2$ 0.09 with 4,4'-MDI in toluene at 50° C. are presented in Table 2.

TABLE 2

| Time (min) | NCO (%) | Diisocyanate (mol/kg) |
|---|---|---|
| 0 | 1.27 | 0.151 |
| 30 | 1.15 | 0.137 |
| 60 | 1.06 | 0.126 |
| 120 | 0.87 | 0.104 |
| 150 | 0.89 | 0.106 |
| 180 | 0.8 | 0.095 |
| 210 | 0.78 | 0.093 |
| 240 | 0.71 | 0.085 |
| 300 | 0.63 | 0.075 |
| 350 | 0.57 | 0.068 |

Example 2

Kinetic data for the reaction of PPE-OH$_2$ 0.09 with 4,4'-MDI in toluene at 60° C. are presented in Table 3.

TABLE 3

| Time (min) | NCO (%) | Diisocyanate (mol/kg) |
|---|---|---|
| 0 | 1.27 | 0.151 |
| 20 | 1.16 | 0.138 |
| 60 | 1.05 | 0.125 |
| 80 | 0.96 | 0.114 |
| 100 | 1.00 | 0.119 |
| 120 | 0.87 | 0.104 |
| 140 | 0.87 | 0.104 |
| 160 | 0.84 | 0.100 |
| 180 | 0.74 | 0.088 |
| 200 | 0.67 | 0.080 |
| 220 | 0.68 | 0.081 |
| 240 | 0.63 | 0.075 |
| 260 | 0.54 | 0.064 |
| 300 | 0.58 | 0.069 |
| 320 | 0.49 | 0.058 |

Example 3

Kinetic data for the reaction of PPE-OH$_2$ 0.09 with 4,4'-MDI in toluene at 70° C. are presented in Table 4.

TABLE 4

| Time (min) | NCO (%) | Diisocyanate (mol/kg) |
|---|---|---|
| 0 | 1.27 | 0.151 |
| 25 | 1.23 | 0.146 |
| 40 | 1.05 | 0.125 |
| 60 | 0.99 | 0.118 |
| 80 | 1.11 | 0.132 |
| 100 | 0.93 | 0.111 |
| 120 | 0.79 | 0.094 |
| 140 | 0.69 | 0.082 |
| 180 | 0.58 | 0.069 |
| 220 | 0.45 | 0.054 |
| 240 | 0.43 | 0.051 |
| 260 | 0.4 | 0.048 |

Examples 1, 2, and 3 show the reaction of hydroxy-diterminated poly(phenylene ether) with diisocyanates without any catalyst. The reaction rate increases with increasing temperature. The data are compared in FIG. 1.

Example 4

This example illustrates the effect of 0.01% dibutyltin dilaurate catalyst on the reaction rate of PPE-OH$_2$ 0.09 with 4,4'-MDI in toluene at 50° C. Data are presented in Table 5.

TABLE 5

| Time (min) | NCO (%) | Diisocyanate (mol/kg) |
|---|---|---|
| 0 | 1.27 | 0.151 |
| 20 | 0.71 | 0.085 |
| 40 | 0.53 | 0.063 |
| 60 | 0.33 | 0.039 |
| 80 | 0.33 | 0.039 |
| 100 | 0.28 | 0.033 |
| 120 | 0.24 | 0.029 |
| 140 | 0.2 | 0.024 |
| 160 | 0.17 | 0.02 |

Figure 2:
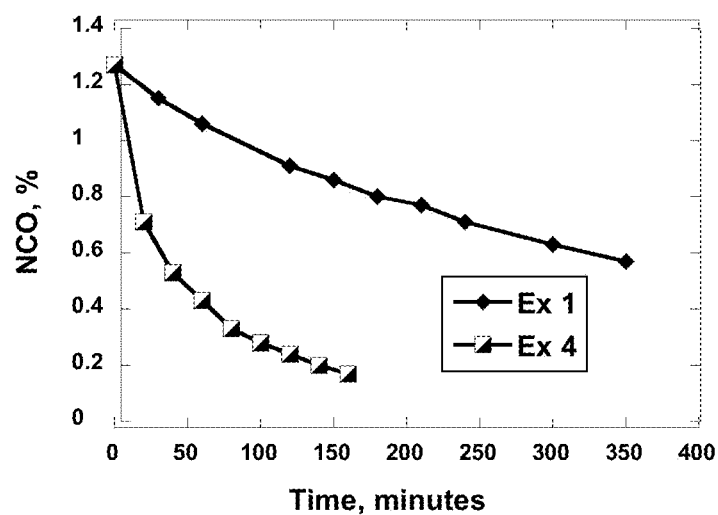
FIG. 2 is a plot of isocyanate concentration versus time for the reactions of Examples 1 and 4.

A comparison of Example 1 with Example 4 shows that the rate of reaction of PPE-OH$_2$ 0.09 with diisocyanate increased sharply (almost 12 times) in the presence of tin catalyst as measured in the reaction at 50° C. The data are compared in FIG. 2.

Figure 3:
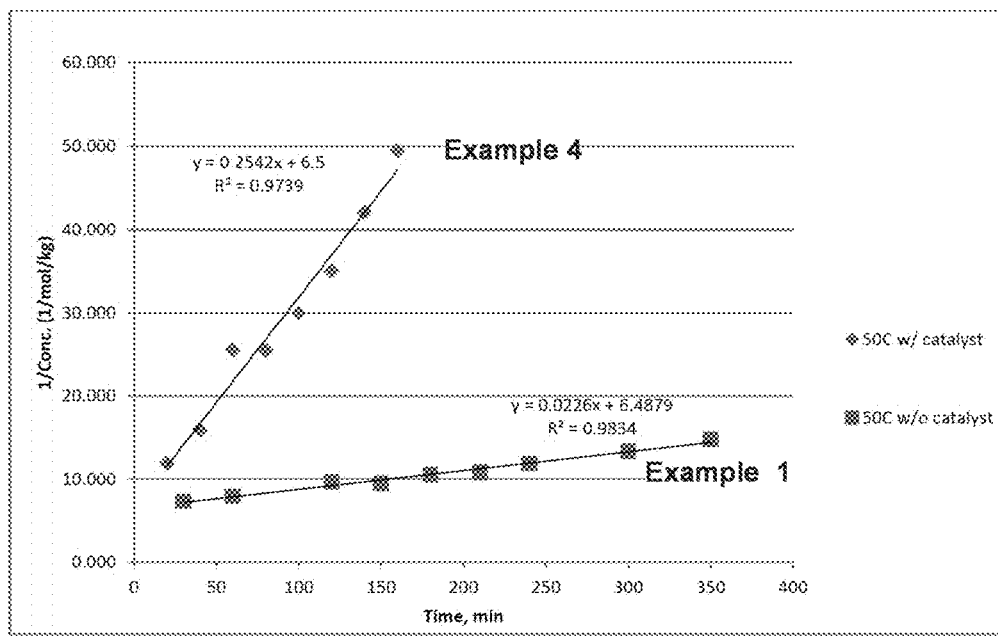
FIG. 3 is a plot of reciprocal isocyanate concentration versus time for the reactions of Examples 1 and 4.
Figure 4:
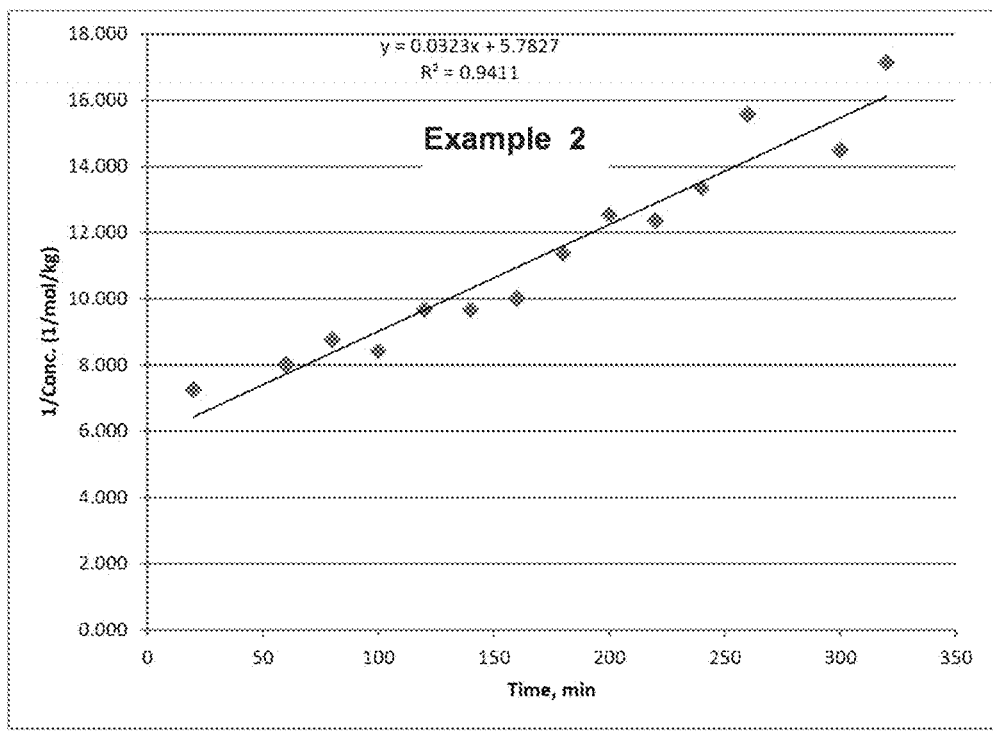
FIG. 4 is a plot of reciprocal isocyanate concentration versus time for the reaction of Example 2.
Figure 5:
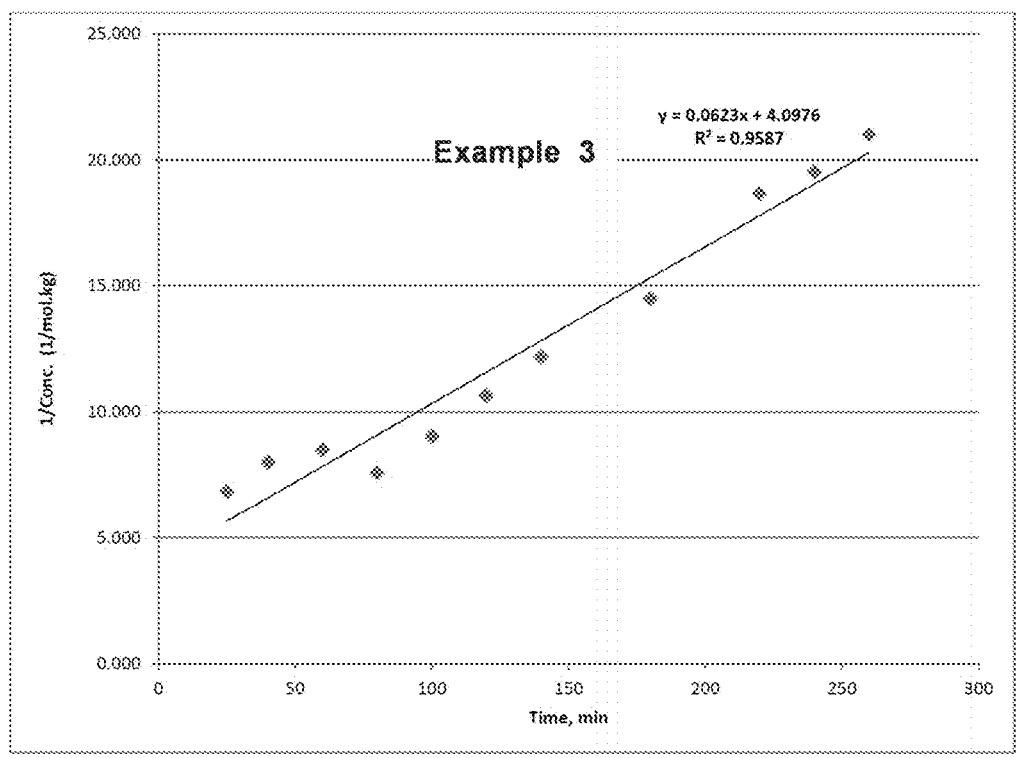
FIG. 5 is a plot of reciprocal isocyanate concentration versus time for the reaction of Example 3.

The reactions at 50° C. (with and without catalyst), at 60° C. and 70° C. followed second order reaction rates up to high degree of isocyanate conversion as shown in FIGS. 3, 4, and 5, respectively.

The kinetic parameters are summarized in Table 6, where "k" is the 2nd order reaction rate constant.

TABLE 6

| | Temp. (° C.) | Catalyst dibutyltin dilaurate | k × 100 (kg mol$^{-1}$ min$^{-1}$) | Half-time of reaction (min.) | Correlation coefficient, $R^2$ |
|---|---|---|---|---|---|
| Ex. 1 | 50 | None | 2.26 | 303 | 0.9834 |
| Ex. 4 | 50 | 0.01% | 25.42 | 26 | 0.9739 |
| Ex. 2 | 60 | None | 3.23 | 208 | 0.9411 |
| Ex. 3 | 70 | None | 6.23 | 107 | 0.9587 |

Examples 5-11

Preparative Examples

The solution polymerizations of PPE-OH$_2$ 0.09, other polyols co-monomers, and chain extenders with 2,4'-/4,4'-MDI were carried out in a three necked 500 milliliter cylindrical flask equipped with a mechanical stirrer, reflux condenser, thermocouple, and nitrogen inlet. The reaction flask was heated via a heating mantle equipped with a temperature controller. The reaction temperature was maintained during reactions at ±3° C.

The specified amount of dry toluene was added to reaction flask at room temperature. PPE-OH$_2$ 0.09 was added incrementally over one hour in small portions to toluene at 60° C. A co-polyol, chain extender, and catalyst were added directly to reaction flask and homogenized while stirring. The mixture was heated to the desired reaction temperature under continuous flow of nitrogen. A weighed amount of isocyanate was added via syringe to the reaction flask and this time was taken as the starting time of reaction. At certain time intervals, a sample of the reaction solution was taken and unreacted isocyanate content determined via di-n-butyl amine titration (ASTM D 5155-10). If the viscosity of polymer solution appeared to increase significantly during polymerization, additional toluene was added to the reaction mixture. Tables 7 and 8 specify the total amount of the toluene used in each synthesis.

The formulations for synthesis of thermoplastic polyurethanes using PPE-OH$_2$ 0.09, low molecular weight co-polyols, and chain extenders with 2,4'-/4,4'-MDI appear in Table 7. The formulations for synthesis of thermoplastic polyurethanes using PPE-OH$_2$ 0.09, high molecular weight co-polyols and chain extenders with 2,4'-/4,4'-MDI appear in Table 8.

TABLE 7

|  | Ex 5 | Ex 6 | Ex 7 | Ex 8 |
|---|---|---|---|---|
| REACTION COMPONENTS | | | | |
| PPE-OH$_2$ 0.09 (grams) | 46.2 | 46.2 | 46.2 | 92.4 |
| 2,4'-/4,4'-MDI (grams) | 6.3 | 12.7 | 12.8 | — |
| Toluene diisocyanate (grams) | — | — | — | 17.84 |
| 1,4-Butanediol (grams) | — | 2.25 | — | — |
| Hydroquinone bis(2-hydroxyethyl) ether (grams) | — | — | 4.96 | — |
| Amine curative (grams) | | | | 1.102 |
| Dibutyltin dilaurate (grams) | 0.0278 | 0.0278 | 0.0278 | 0.04 |
| Toluene (grams) | 106.7 | 106.7 | 146 | 204.77 |
| Solid content (%) | 23.9 | 36.4 | 30.5 | 35.3 |
| NCO/OH equivalent ratio | 1.02 | 1.02 | 1.02 | 2.05 |
| REACTION CONDITIONS | | | | |
| Temperature (° C.) | 60 | 70 | 100 | 70 |
| Time (min) | 300 | 180 | 360 | 180 |

TABLE 8

|  | Ex 9 | Ex 10 | Ex 11 |
|---|---|---|---|
| REACTION COMPONENTS | | | |
| PPE-OH$_2$ 0.09 (grams) | 50 | 50 | 50 |
| Poly(oxytetramethylene) glycol (grams) | 50 | — | — |
| Poly(butylene adipate) polyester diol (grams) | — | 50 | — |
| Ortho phthalate-diethylene glycol based aromatic polyester polyol (grams) | — | — | 50 |
| 2,4'-/4,4'-MDI, (grams) | 19.1 | 13.3 | 26.8 |
| Dibutyltin dilaurate (grams) | 0.04 | 0.04 | 0.0278 |
| Toluene (grams) | 193.4 | 202.2 | 193.4 |
| Solid content (%) | 38.1 | 34.1 | 39.6 |
| NCO/OH equivalent ratio | 1.02 | 1.02 | 1.02 |
| REACTION CONDITIONS | | | |
| Temperature (° C.) | 70 | 80 | 80 |
| Time (min) | 300 | 360 | 300 |

The extent of the polymerization reaction of PPE-OH$_2$ 0.09, low molecular weight co-polyols, and chain extenders with 2,4'-/4,4'-MDI was followed by measuring the isocyanate levels (NCO %) at different time intervals during the syntheses via solution polymerization. Data for Examples 5, 6, 7, and 8 are shown in Table 9.

TABLE 9

| Time (min) | Ex 5 | Ex 6 | Ex 7 | Ex 8 |
|---|---|---|---|---|
| | NCO (%) | | | |
| 0 | 1.4 | 2.5 | 1.3 | 1.4 |
| 60 | — | — | 0.86 | 1.2 |
| 120 | — | 0.22 | — | — |
| 180 | 0.23 | 0.12 | 0.1 | 1.1 |
| 240 | — | — | — | — |

TABLE 9-continued

| Time (min) | Ex 5 | Ex 6 | Ex 7 | Ex 8 |
|---|---|---|---|---|
| | NCO (%) | | | |
| 300 | 0.12 | — | — | — |
| 360 | — | — | 0.06 | — |

The extent of the polymerization reaction of PPE-OH$_2$ 0.09 and high molecular weight co-polyols with 2,4'-/4,4'-MDI was followed by measuring the isocyanate levels (NCO %) at different time intervals during the syntheses via solution polymerization. Data for Examples 9, 10, and 11 are shown in Table 10.

TABLE 10

| Time (min) | Ex. 9 | Ex. 10 | Ex. 11 |
|---|---|---|---|
| | NCO (%) | | |
| 0 | 2 | 1.5 | 2.8 |
| 60 | 0.32 | 0.3 | — |
| 120 | 0.29 | 0.28 | 0.43 |
| 180 | — | 0.26 | 0.31 |
| 240 | 0.18 | — | — |
| 300 | 0.12 | 0.16 | 0.2 |
| 360 | — | 0.13 | — |

The data in Tables 9 and 10 indicate that the hydroxy-diterminated poly(phenylene ether) along with the polyols react with the diisocyanates to give thermoplastic polyurethanes.

Films were cast from thermoplastic polyurethane solutions prepared in Examples 5-11 and were characterized. Data appear in Tables 11 and 12. All thermoplastic polyurethanes exhibited high glass transition temperatures ($T_g$ values) and high char yields.

TABLE 11

|  | Ex. 5 | Ex. 6 | Ex. 7 | Ex. 8 |
|---|---|---|---|---|
| Tg (° C.) | 170.2 | 165.3 | 160.1 | 169 |
| M$_w$ (amu) | 105,860 | 93,294 | 112,940 | 18,750 |
| M$_n$ (amu) | 13,804 | 13,499 | 12,710 | 3,807 |
| Char in nitrogen at 600° C. (wt %) | 23.32 | 17.63 | 17.23 | 18.03 |
| Char in nitrogen at 700° C. (wt %) | 21.05 | 16.07 | 15.77 | 16.48 |
| Char in nitrogen at 800° C. (wt %) | 19.67 | 15.27 | 14.92 | 15.65 |
| Char in air at 600° C. (wt %) | 35.29 | 28.26 | 26.34 | 27.11 |
| Char in air at 700° C. (wt %) | 7.85 | 8.79 | 4.63 | 11.24 |
| Char in air at 800° C. (wt %) | 3.19 | 0.35 | 1.91 | 0.64 |

TABLE 12

|  | Ex. 9 | Ex. 10 | Ex. 11 |
|---|---|---|---|
| Tg (° C.) | ND | 163.7 | 133.2 |
| M$_w$ (amu) | 107330 | 62170 | ND |
| M$_n$ (amu) | 14844 | 10094 | ND |
| Tensile Strength @ Break (MPa) | 19.42 | 24.52 | ND |
| Tensile Strength @ Yield (MPa) | 15.99 | 20.44 | ND |
| Char in nitrogen at 600° C. (wt %) | 10.53 | 11.16 | ND |
| Char in nitrogen at 700° C. (wt %) | 9.79 | 10.28 | ND |
| Char in nitrogen at 800° C. (wt %) | 9.33 | 9.8 | ND |
| Char in air at 600° C. (wt %) | 20.3 | 18.04 | ND |

TABLE 12-continued

|  | Ex. 9 | Ex. 10 | Ex. 11 |
|---|---|---|---|
| Char in air at 700° C. (wt %) | 5.97 | 4.6 | ND |
| Char in air at 800° C. (wt %) | 0.64 | 0.34 | ND |

ND = not determined

Examples 12 and 13

In Example 12, a polyurethane was synthesized from higher molecular weight hydroxy-diterminated poly(phenylene ether) (PPE-OH$_2$ 0.12) with 4,4'-MDI using the solution polymerization procedure.

In Example 13, a polyurethane was synthesized from lower molecular weight hydroxy-diterminated poly(phenylene ether) (PPE-OH$_2$ 0.06) with 4,4'-MDI using the solution polymerization procedure.

Formulation and characterization of Examples 12 and 13 are summarized in Table 13, where amounts of hydroxy-diterminated poly(phenylene ether) are expressed in weight percent based on the total weight of diol and diisocyanate, and amounts of dibutyltin dilaurate are expressed in parts per hundred weight resin (i.e., parts by weight per 100 parts by weight diol and diisocyanate). The thermoplastic polyurethanes formed in Examples 12 and 13 exhibited high $T_g$ values and high char yield.

TABLE 13

|  | Ex. 12 | Ex. 13 |
|---|---|---|
| REACTION COMPONENTS | | |
| PPE-OH$_2$ 0.12 (wt %) | 92.48 | — |
| PPE-OH$_2$ 0.06 (wt %) | — | 83.98 |
| 2,4'-/4,4'-MDI, wt % | 7.52 | 16.02 |
| Dibutyltin dilaurate (phr) | 0.0520 | 0.0540 |
| PROPERTIES | | |
| $T_g$ (° C.) | 185 | 152 |
| $M_w$ (amu) | 79,243 | 99,765 |
| $M_n$ (amu) | 15764 | 12706 |
| Char in nitrogen at 600° C. (wt %) | 25.37 | 20.93 |
| Char in nitrogen at 700° C. (wt %) | 23.23 | 18.92 |
| Char in nitrogen at 800° C. (wt %) | 21.47 | 17.6 |
| Char in air at 600° C. (wt %) | 38.71 | 31.05 |
| Char in air at 700° C. (wt %) | 11.55 | 6.43 |
| Char in air at 800° C. (wt %) | 4.97 | 2.93 |

Example 14, Comparative Example A

Thermoplastic polyurethanes were prepared using bulk polymerization. The general procedure for bulk polymerization of hydroxy-diterminated poly(phenylene ether) and diols with diisocyanates to from TPUs was as follows:

1. A degassed, preheated mixture of hydroxy-diterminated poly(phenylene ether) and diols were added to a Speed Mixer cup;
2. The contents of the Speed Mixer cup were mixed for 30 seconds at 2200 rotations per minute (rpm);
3. The resulting mixture was heated for 15 minutes in an oven at 120° C.;
4. Liquid diisocyanate at 80° C. was added to the heated mixture via syringe;
5. The resulting mixture was mixed via Speed Mixer for 30 seconds at 2200 rpm;
6. The mixture was then transferred into a 120° C. aluminum mold covered with a sheet of polytetrafluoroethylene;
7. At the gel time, the mold was closed and the reaction advanced for 2 hours at 120° C.;
8. The reaction mixture was then further reacted for 20 hours at 100° C.;
9. Sheets of the resulting material were prepared by compression molding in a Carver press.

For Example 14, thermoplastic polyurethane was prepared by bulk polymerization using PPE-OH$_2$ 0.09, poly(oxytetramethylene) glycol, butanediol, and 4,4'-MDI. Formulation and characterization are summarized in Table 14. The material exhibits very high elongation at break which is characteristic of thermoplastic elastomers. Compared to Comparative Example A prepared without a hydroxy-diterminated poly(phenylene ether), Example 14 had higher VICAT softening temperature and higher char yield and better mechanical properties at elevated temperatures.

TABLE 14

|  | C. Ex. A | Ex. 14 |
|---|---|---|
| REACTION COMPONENTS | | |
| PTMG1000 (pbw) | 63.82 | 49.67 |
| PPE-OH$_2$ 0.09 (pbw) | 0.00 | 16.56 |
| 4,4'-MDI (pbw) | 30.70 | 28.74 |
| BD (pbw) | 5.48 | 5.03 |
| PROPERTIES | | |
| Hardness Shore A | 86 | 88 |
| Hardness Shore D | 37 | 40 |
| Tensile Strength at break, 23° C. (MPa) | 24.50 | 28.42 |
| Elongation at break, 23° C. (%) | 808 | 554 |
| Max. Tear Strength - Die C (N/cm) | 1305 | 833 |
| Constant Deflection Compression Set, Ct (%) | 6.1 | 6.6 |
| Tensile Strength at break, 50° C. (MPa) | 9.3 | 14.7 |
| Elongation at break, 50° C. (%) | 496 | 517 |
| Tensile Strength at break, 70° C. (MPa) | 6.7 | 9.2 |
| Elongation at break, 70° C. (%) | 502 | 443 |
| VICAT A (° C.) | 74.2 | 107.8 |
| Char in nitrogen at 600° C. (wt %) | 1.8 | 5.3 |
| Char in nitrogen at 700° C. (wt %) | 1.7 | 5.1 |
| Char in nitrogen at 800° C. (wt %) | 1.6 | 4.9 |
| Char in air at 600° C. (wt %) | 4.4 | 9.8 |
| Char in air at 700° C. (wt %) | 0.1 | 0.2 |
| Char in air at 800° C. (wt %) | 0.1 | 0.2 |
| Oxidative Resistance at 100° C. for 7 days | | |
| Tensile Strength at break at 23° C. (MPa) | 8.28 | 20.81 |
| Elongation at break at 23° C. (%) | 874 | 870 |
| $T_g$ (° C.) | −31 | −27 |
| Solvent resistance, post-test sample weight (%) relative to pre-test sample weight of 100% | | |
| Toluene | 81.2 | 53.1 |
| MEK | Dissolved | 117 |
| Oil | 0.33 | 0.06 |
| Hydrochloric Acid, pH 1 | 1.5 | 1.2 |
| Sodium hydroxide, pH 13 | 1.5 | 1.2 |
| Hydrolytic Stability at 50° C. for 7 days, | | |
| Weight change (%) | 1.5 | 1.2 |

Examples 15-17, Comparative Example B

A series of thermoplastic polyurethanes were prepared by bulk polymerization using hydroxy-diterminated poly(phenylene ether), Polyether diol 2 (Ethylene oxide-capped oxypropylated polyether diol), butanediol, and 4,4'-MDI. The hydroxy-diterminated poly(phenylene ether) content was 0, 10, 20, and 30 weight percent in Comparative Example B, Example 15, Example 16, and Example 17, respectively. Formulation and characterization are summarized in Table 15. All materials exhibited very high elongation at break, which is characteristic of thermoplastic elastomers. Char yield increased with hydroxy-diterminated poly(phenylene ether) levels. In addition, Taber abrasion decreased with increased levels of hydroxy-diterminated poly(phenylene ether). Moreover, tear strength increased with increased levels of hydroxy-diterminated poly(phenylene ether). Formulations and properties are summarized in Table 15.

respective glass transition temperatures, however, the coefficient of thermal expansion of Example 17 was lower above its glass transition temperature compared to Comparative Example B;

Oxidative resistance properties (7 days aging at 100° C.) of the thermoplastic polyurethanes containing the resi-

TABLE 15

| Formulation | C. Ex. B | Ex. 15 | Ex. 16 | Ex. 17 |
|---|---|---|---|---|
| REACTION COMPONENTS | | | | |
| Polyether diol 2 (wt %) | 76.70 | 68.89 | 61.17 | 53.67 |
| PPE-OH$_2$ 0.09 (pbw) | — | 7.65 | 15.29 | 23.00 |
| 4,4'-MDI (wt %) | 19.99 | 19.95 | 20.02 | 20.34 |
| BD (wt %) | 3.31 | 3.51 | 3.52 | 2.99 |
| Dibutyltin dilaurate (phr) | 0.2160 | 0.0038 | 0.0267 | 0.0524 |
| PROPERTIES | | | | |
| Hardness Shore A | 43 | 62 | 63 | 83 |
| Bayshore resilience (%) | 58 | 42 | 25 | 16 |
| Tensile Strength at break, 23° C. (MPa) | 4.64 | 0.65 | 1.95 | 28.45 |
| Elongation at break, 23° C. (%) | 774 | 984 | 1115 | 549 |
| Tensile Strength at yield, 23° C. (MPa) | — | 0.69 | 5.43 | — |
| Elongation at yield, 23° C. (%) | — | 100 | 787 | — |
| Tensile Strength at break, 50° C. (MPa) | 2.24 | 0.26 | 0.62 | 7.46 |
| Elongation at break, 50° C. (%) | 504 | 487 | 478 | 359 |
| Tensile Strength at break, 70° C. (MPa) | 1.49 | 0.08 | 0.11 | 4.31 |
| Elongation at break, 70° C. (%) | — | 263 | 334 | 307 |
| Max. Tear Strength - Die C (N/cm) | 185 | 229 | 367 | 833 |
| Constant Deflection Compression Set, Ct (%) | 16 | 20.3 | 18 | 11 |
| Taber Abrader Test Weight Loss (%) | 0.0131 | 0.0109 | 0.0108 | 0.003 |
| Char in nitrogen at 600° C. (wt %) | 1.5 | 2.9 | 5 | 7 |
| Char in nitrogen at 700° C. (wt %) | 1.4 | 2.7 | 4.6 | 6.4 |
| Char in nitrogen at 800° C. (wt %) | 1.3 | 2.6 | 4.5 | 6 |
| Char in air at 600° C. (wt %) | 0.7 | 5.9 | 7 | 8.5 |
| Char in air at 700° C. (wt %) | 0.1 | 0.1 | 0.1 | 0.1 |
| Char in air at 800° C. (wt %) | 0.1 | 0.1 | 0.1 | 0.1 |
| $M_n$ (amu) | 16014 | 15219 | 20889 | 14438 |
| $M_w$ (amu) | 134721 | 128710 | 230010 | 167610 |

Additional characterization of Comparative Example B and Examples 15-17 is summarized in Table 16. In the solvent resistance test with methyl ethyl ketone (MEK), samples for Comparative Example B and Example 15 completely dissolved, the sample for Example 16 partially dissolved and lost its structural integrity, and the sample for Example 17 gained weight, presumably by absorbing solvent. Further observations include:

The glass transition temperature increased with thermoplastic polyurethanes containing the residue of hydroxy-diterminated poly(phenylene ether);

Coefficient of thermal expansion of Comparative Example B and Example 17 were similar below their respective glass transition temperatures, however, the coefficient of thermal expansion of Example 17 was lower above its glass transition temperature compared to Comparative Example B;

due of hydroxy-diterminated poly(phenylene ether) exceeded those of Comparative Example B;

Solvent resistance in polar and non-polar media improved with increasing levels of hydroxy-diterminated poly(phenylene ether);

Resistance to strong base and strong acid was improved with increasing levels of hydroxy-diterminated poly(phenylene ether);

Dielectric constant and dissipation factor (loss tangent) decreased with increasing levels of hydroxy-diterminated poly(phenylene ether);

Water absorption decreased with increasing levels of hydroxy-diterminated poly(phenylene ether).

TABLE 16

| | C. Ex. B | Ex. 15 | Ex. 16 | Ex. 17 |
|---|---|---|---|---|
| $T_g$ by TMA (° C.) | −40.5 | −33 | −28 | −14 |
| CTE by TMA | | | | |
| Below $T_g$ (μm/m-° C.) | 53.4 | ND | ND | 59.2 |
| Above $T_g$ (μm/m-° C.) | 363 | ND | ND | 228 |
| Dielectrical properties | | | | |
| Dielectric Constant at 1 MHz | 6.38 | 5.49 | 4.75 | 4.25 |
| Dissipation Factor at 1 MHz | 0.124 | 0.109 | 0.088 | 0.071 |
| Oxidative Resistance Test, 100° C., 7 days | | | | |
| Tensile Strength at break, 23° C. (kPa) | Too soft to be tested | 820 | 834 | 1862 |

TABLE 16-continued

|  | C. Ex. B | Ex. 15 | Ex. 16 | Ex. 17 |
|---|---|---|---|---|
| Elongation at break, 23° C. (%) | Too soft to be tested | 474 | 880 | 453 |
| Glass transition temperature via DSC, (° C.) | −45 | −35 | −28 | −13 |
| Solvent resistance, post-test sample weight (%) relative to pre-test sample weight of 100% | | | | |
| Toluene | 290 | 242 | 201 | 153 |
| MEK | Dissolved | Dissolved | Dissolved partially | 252 |
| Hydrochloric Acid, pH 1 | 84 | 64 | 47 | 19 |
| Sodium hydroxide, pH 13 | 70 | 62 | 47 | 28 |
| Water absorption. 50° C. and 100% RH for 7 days, Weight change (%) | 11.8 | 7.5 | 6.2 | 4.7 |

The invention claimed is:

1. A linear thermoplastic polyurethane comprising:

at least three poly(phenylene ether) repeat units having the structure

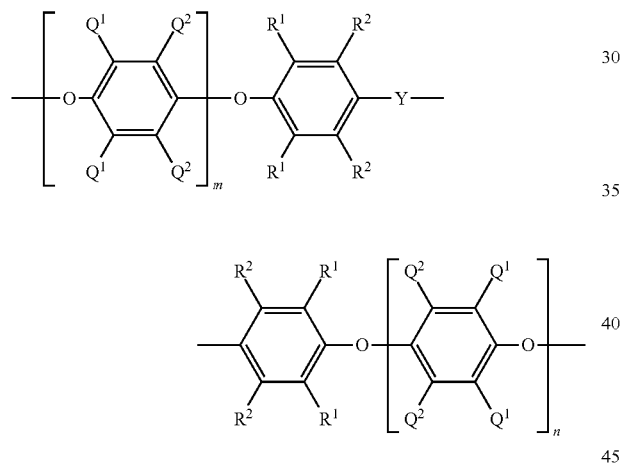

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, $C_1$-$C_{12}$ hydrocarbylthio, hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; m and n are independently 0 to 20, provided that the sum of m and n is at least 3; and Y is selected from

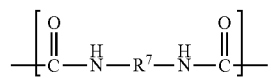

wherein each occurrence of $R^3$-$R^6$ is independently hydrogen or $C_1$-$C_{12}$ hydrocarbyl; and at least three diisocyanate residue repeat units having the structure $$-\!\left[\!\!\begin{array}{c}O\\\|\\C\end{array}\!\!-\!\!\begin{array}{c}H\\\|\\N\end{array}\!\!-\!R^7\!-\!\!\begin{array}{c}H\\\|\\N\end{array}\!\!-\!\!\begin{array}{c}O\\\|\\C\end{array}\!\!\right]\!-$$

wherein $R^7$ is, independently in each repeat unit, $C_4$-$C_{18}$ hydrocarbylene;

wherein at least one terminal oxygen atom of each poly (phenylene ether) repeat unit is covalently bonded to a terminal carbamoyl group of a diisocyanate residue repeat unit to form a urethane moiety.

2. The linear thermoplastic polyurethane of claim 1, wherein the poly(phenylene ether) repeat units have the structure

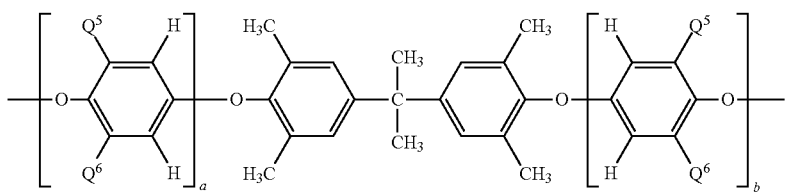

wherein each occurrence of $Q^5$ and $Q^6$ is independently methyl or di-n-butylaminomethyl; and each occurrence of a and b is independently 0 to 20, provided that the sum of a and b is at least 3.

3. The linear thermoplastic polyurethane of claim 1, wherein each diisocyanate residue repeat units independently has a structure selected from

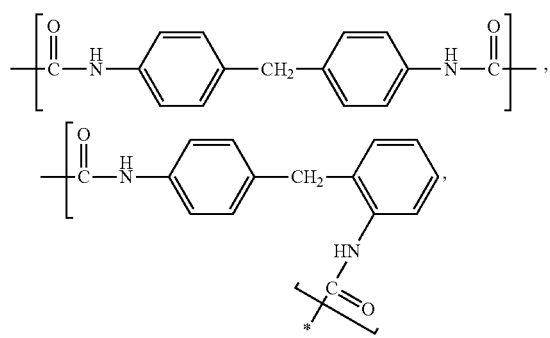

-continued

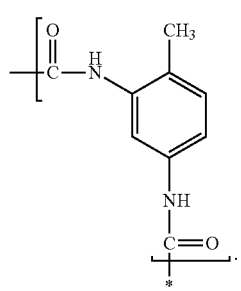

4. The linear thermoplastic polyurethane of claim 1, further comprising at least three diol repeat units, each diol repeat unit comprising the residue of an alkylene diol, an alkylene ether diol, a polyether diol, an alkoxylate of an aromatic diol, or a polyester diol.

5. The linear thermoplastic polyurethane of claim 1, comprising 5 to 95 weight percent of the poly(phenylene ether) repeat units, and 5 to 40 weight percent of the diisocyanate residue repeat units.

6. The linear thermoplastic polyurethane of claim 5, further comprising 5 to 70 weight percent of diol repeat units, each diol repeat unit comprising the residue of an alkylene diol, an alkylene ether diol, a polyether diol, an alkoxylate of an aromatic diol, or a polyester diol.

7. The linear thermoplastic polyurethane of claim 1, having a weight average molecular weight of 10,000 to 250,000 atomic mass units.

8. The linear thermoplastic polyurethane of claim 1, wherein the poly(phenylene ether) repeat units have the structure

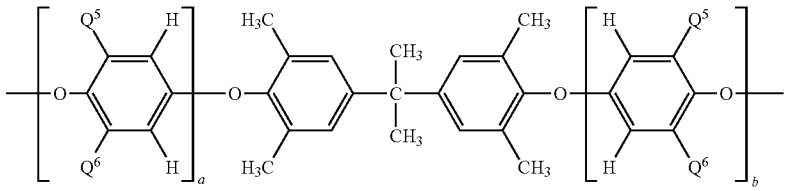

wherein each occurrence of $Q^5$ and $Q^6$ is independently methyl or di-n-butylaminomethyl; and each occurrence of a and b is independently 0 to 20, provided that the sum of a and b is at least 3;

wherein the diisocyanate residue repeat units have a structure selected from

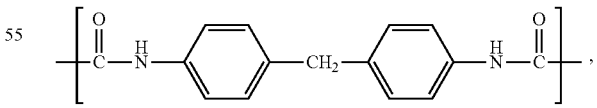

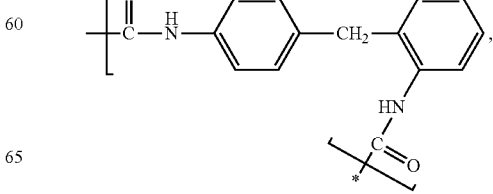

-continued

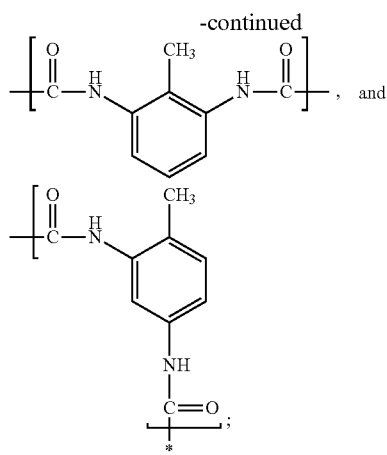

and wherein the linear thermoplastic polyurethane further comprises at least three diol repeat units, each diol repeat unit comprising the residue of an alkylene diol, an alkylene ether diol, a polyether diol, an alkoxylate of an aromatic diol, or a polyester diol.

9. An article comprising a linear thermoplastic polyurethane comprising:

at least three poly(phenylene ether) repeat units having the structure

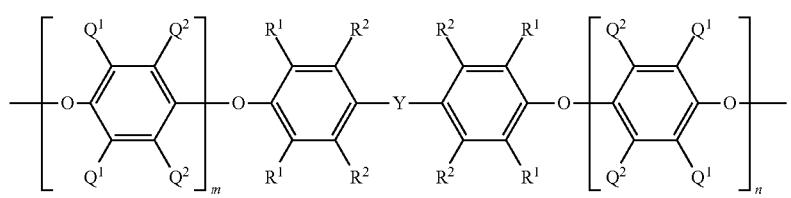

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; m and n are independently 0 to 20, provided that the sum of m and n is at least 3; and Y is selected from

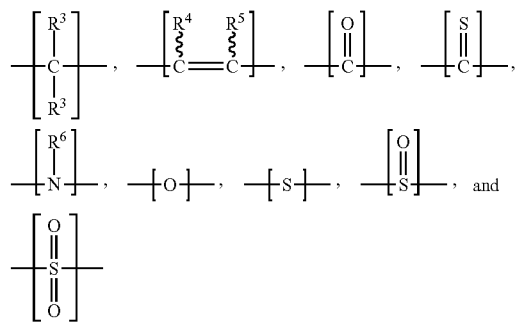

wherein each occurrence of $R^3$-$R^6$ is independently hydrogen or $C_1$-$C_{12}$ hydrocarbyl; and at least three diisocyanate residue repeat units having the structure

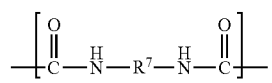

wherein $R^7$ is, independently in each repeat unit, $C_4$-$C_{18}$ hydrocarbyl;

wherein at least one terminal oxygen atom of each poly(phenylene ether) repeat unit is covalently bonded to a terminal carbamoyl group of a diisocyanate residue repeat unit to form a urethane moiety.

10. The article of claim 9, wherein the article is selected from the group consisting of films, cable sheathing, spiral tubing, pneumatic tubing, blow molded bellows, ski boot shells, sport shoe soles, caster tires, automotive body panels, and automotive rocker panels.

11. A method of forming a linear thermoplastic polyurethane, the method comprising:

reacting a hydroxy-diterminated poly(phenylene ether) with an organic diisocyanate to form a linear thermoplastic polyurethane;

wherein the hydroxy-diterminated poly(phenylene ether) has the structure

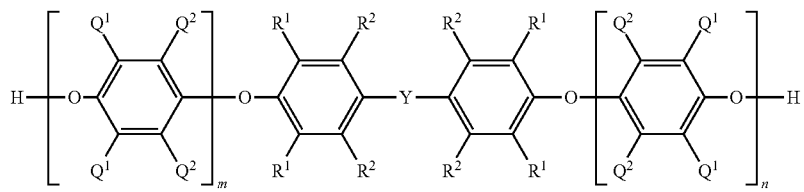

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, $C_1$-$C_{12}$ hydrocarbylthio, hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; m and n are independently 0 to 20, provided that the sum of m and n is at least 3; and Y is selected from wherein the linear thermoplastic polyurethane comprises at least three poly(phenylene ether) repeat units and at least three diisocyanate residue repeat units.

12. The method of claim 11, comprising reacting the organic diisocyanate with the hydroxy-diterminated poly (phenylene ether) and a diol selected from the group consisting of alkylene diols, alkylene ether diols, polyether diols, alkoxylates of aromatic diols, polyester diols, and combinations thereof.

13. The method of claim 11, wherein said reacting is conducted in the absence of a catalyst.

14. The method of claim 11, wherein said reacting is conducted in the presence of a catalyst.

15. The method of claim 11, wherein said reacting is conducted in the absence of solvent.

16. The method of claim 11, wherein the hydroxy-diterminated poly(phenylene ether) has the structure

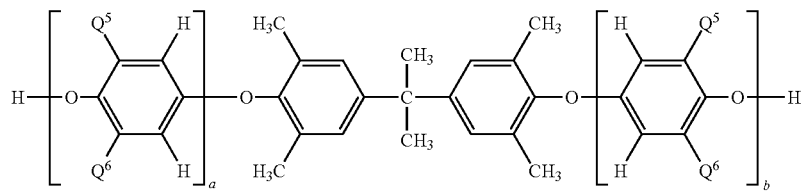

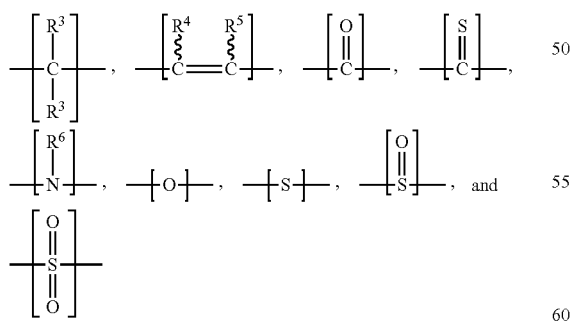

wherein each occurrence of $R^3$-$R^6$ is independently hydrogen or $C_1$-$C_{12}$ hydrocarbyl; and
wherein the organic diisocyanate has the structure $$O=C=N-R^7-N=C=O$$

wherein $R^7$ is $C_4$-$C_{18}$ hydrocarbylene; and wherein each occurrence of $Q^5$ and $Q^6$ is independently methyl or di-n-butylaminomethyl, and each occurrence of a and b is independently 0 to 20, provided that the sum of a and b is at least 3;

wherein the organic diisocyanate is selected from the group consisting of 2,4'-diphenylmethane diisocyanate, 4,4'-diphenylmethane diisocyanate, toluene 2,6-diisocyanate, toluene 2,4-diisocyanate, and combinations thereof; and wherein the method comprises reacting the organic diisocyanate with the hydroxy-diterminated poly(phenylene ether) and a diol selected from the group consisting of alkylene diols, alkylene ether diols, polyether diols, alkoxylates of aromatic diols, polyester diols, and combinations thereof.

* * * * *